United States Patent
Basu et al.

(10) Patent No.: US 6,804,648 B1
(45) Date of Patent: Oct. 12, 2004

(54) IMPULSIVITY ESTIMATES OF MIXTURES OF THE POWER EXPONENTIAL DISTRUBUTIONS IN SPEECH MODELING

(75) Inventors: Sankar Basu, Tenafly, NJ (US); Charles A. Micchelli, Mogehan Lake, NY (US); Peder A. Olsen, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/275,782

(22) Filed: Mar. 25, 1999

(51) Int. Cl.[7] .............................................. G10L 15/28
(52) U.S. Cl. ..................................... 704/255; 704/231
(58) Field of Search ................................ 704/255, 231

(56) References Cited

U.S. PATENT DOCUMENTS

| | | | | |
|---|---|---|---|---|
| 5,193,142 A | * | 3/1993 | Zhao ........................... | 704/200 |
| 5,289,562 A | * | 2/1994 | Mizuta et al. ............... | 704/200 |
| 5,450,523 A | * | 9/1995 | Zhao ........................... | 704/243 |
| 5,473,728 A | * | 12/1995 | Luginbuhl et al. .......... | 704/243 |
| 5,522,011 A | * | 5/1996 | Epstein et al. ............... | 704/222 |
| 5,715,367 A | * | 2/1998 | Gillick et al. ............... | 704/254 |
| 5,778,341 A | * | 7/1998 | Zeljkovic .................... | 704/256 |
| 5,799,277 A | * | 8/1998 | Takami ........................ | 704/256 |
| 5,839,105 A | * | 11/1998 | Ostendorf et al. ........... | 704/256 |
| 5,895,447 A | * | 4/1999 | Ittycheriah et al. .......... | 704/231 |
| 5,946,656 A | * | 8/1999 | Rahim et al. ................ | 704/256 |
| 6,003,002 A | * | 12/1999 | Netsch ......................... | 704/236 |
| 6,009,390 A | * | 12/1999 | Gupta et al. ................. | 704/240 |
| 6,021,387 A | * | 2/2000 | Mozer et al. ................ | 704/232 |
| 6,269,334 B1 | * | 7/2001 | Basu et al. ................... | 704/256 |

OTHER PUBLICATIONS

Kenny et al, "Separation of Non–Spontaneous and Spontaneous Speech", IEEE 1998.*

* cited by examiner

*Primary Examiner*—Doris H. To
*Assistant Examiner*—Michael N. Opsasnick
(74) *Attorney, Agent, or Firm*—Whitham, Curtis & Christofferson, P.C.; Stephen C. Kaufman

(57) ABSTRACT

A parametric family of multivariate density functions formed by mixture models from univariate functions of the type $\exp(-|x|^\beta)$ for modeling acoustic feature vectors are used in automatic recognition of speech. The parameter $\beta$ is used to measure the non-Gaussian nature of the data. $\beta$ is estimated from the input data using a maximum likelihood criterion. There is a balance between $\beta$ and the number of data points that must be satisfied for efficient estimation.

13 Claims, 22 Drawing Sheets

(15 of 22 Drawing Sheet(s) Filed in Color)

IMPULSIVITY ESTIMATES OF MIXTURES OF THE POWER EXPONENTIAL DISTRUBUTIONS IN SPEECH MODELING

BACKGROUND OF THE INVENTION

FIELD OF THE INVENTION

The present invention generally relates to the technology of speech recognition and, more particularly, to a parametric family of multivariate density functions formed by mixture models from univariate functions for modeling acoustic feature vectors used in automatic recognition of speech.

BACKGROUND DESCRIPTION

Most pattern recognition problems require the modeling probability density of feature vectors in feature space. Specifically, in the problem of speech recognition, it is necessary to model the probability density of acoustic feature vectors in the space of phonetic units. Purely Gaussian densities have been known to be inadequate for this purpose due to the heavy tailed distributions observed by speech feature vectors. See, for example, Frederick Jelenik, *Statistical Methods for Speech Recognition*, MIT Press (1997). As an intended remedy to this problem, practically all speech recognition systems attempt modeling by using a mixture model with Gaussian densities for mixture components. Variants of the standard K-means clustering algorithm are used for this purpose. The classical version the K-means algorithm as described by John Hartigan in *Clustering Algorithms*, John Wiley & Sons (1975), and Anil Jain and Richard Dubes in *Algorithms for Clustering Data*, Prentice Hall (1988), can also be viewed as a special case of the expectation-maximization (EM) algorithm (see A. P. Dempster, N. M. Laird and D. B. Baum, "Maximum likelihood from incomplete data via the EM algorithm", *Journal of Royal Statistical Soc.*, Ser. B, vol., 39, pp. 1–38, 1997) for mixtures of Gaussians with variances tending to zero. See also Christopher M. Bishop, *Neural Networks for Pattern Recognition*, Cambridge University Press (1997), and F. Marroquin and J. Girosi, "Some extensions of the K-means algorithm for image segmentation and pattern classification", MIT Artificial Intelligence Lab. A. I. Memorandum no. 1390, January 1993. The only attempt to model the phonetic units in speech with non-Gaussian mixture densities is described by H. Ney and A. Noll in "Phoneme modeling using continuous mixture densities", *Proceedings of IEEE Int. Conf on Acoustics Speech and Signal Processing*, pp. 437–440, 1998, where Laplacian densities were used in a heuristic base estimation algorithm.

S. Basu and C. A. Micchelli in "Parametric density estimation for the classification of acoustic feature vectors in speech recognition", *Nonlinear Modeling: Advanced Black-Box Techniques* (Eds. J. A. K. Suykens and J. Vandewalle), pp. 87–118, Kluwer Academic Publishers, Boston (1998), attempted to model speech data by building probability densities from a given univariate function h(t) for $t \geq 0$. Specifically, Basu and Micchelli considered mixture models from component densities of the form $$p(x \mid u, \Sigma) = \rho_d \frac{1}{\sqrt{\det \Sigma}} \exp(-(h(Q(x)))), x \in R^d \text{ where} \quad (1)$$

$$Q(x) = \gamma_d (x - \mu)^t \Sigma^{-1} (x - u), x \in R^d, \quad (2)$$

$$m_\beta = \int_{R_+} t^\beta f(t) dt, \quad (3)$$

(when the integral is finite and $R_+$ denotes the positive real axis)

$$\rho_d = \frac{\Gamma\left(\frac{d}{2}\right)\left(m_{\frac{d}{2}}\right)^{\frac{d}{2}}}{\pi^{\frac{d}{2}}\left(m_{\frac{d}{2}-1}\right)^{\frac{d}{2}+1}}, \text{ and} \quad (4)$$

$$\gamma_d = \frac{m_{\frac{d}{2}}}{d m_{\frac{d}{2}-1}}. \quad (5)$$

If the constraints $\rho_d$ and $\gamma_d$ are positive and finite, then the vector $\mu \in R^d$ and the positive definite symmetric d×d matrix $\Sigma$ are the mean and the covariance of this density. Particular attention was given to the choice $h(t)=t^{\alpha/2}$, $t>0$, $\alpha>0$; the case $\alpha=2$ corresponds to the Gaussian density, whereas the Laplacian case considered by H. Ney and A. Noll, supra, corresponds to $\alpha=1$. Smaller values of $\alpha$ correspond to more peaked distributions ($\alpha \to 0$ yields the $\delta$ function), whereas larger values of $\alpha$ correspond to distributions with flat tops ($\alpha \to \infty$ yields the uniform distribution over elliptical regions). For more details about these issues see S. Basu and C. Micchelli, supra. This particular choice of densities has been studied in the literature and referred to in various ways; e.g., $\alpha$-stable densities as well as power exponential distributions. See, for example, E. Gòmez, M. A. Gòmez-Villegas, and J. M. Marin, "A multivariate generalization of the power exponential family of distributions", *Comm. Stat.—Theory Meth.* 17(3), pp. 589–600, 1998, and Owen Kenny, Douglas Nelson, John Bodenschatz and Heather A. McMonagle, "Separation of nonspontaneous and spontaneous speech", *Proc. ICASSP*, 1998.

In S. Basu and C. Micchelli, supra, an iterative algorithm having the expectation-maximization (EM) flavor for estimating the parameters was obtained and used for a range of fixed values of $\alpha$ (as opposed to the choice of $\alpha=1$ in H. Ney and A. Noll, supra, and $\alpha=2$ in standard speech recognition systems). A preliminary conclusion from the study in S. Basu and C. Micchelli was that the distribution of speech feature vectors in the acoustic space are better modeled by mixture models with non-Gaussian mixture components corresponding to $\alpha<1$. As a consequence of these encouraging results, we became interested in automatically finding the "best" value of $\alpha$ directly from the data. It is this issue that is the subject of the present invention.

SUMMARY OF THE INVENTION

It is therefore an object of the present invention to provide a parametric family of multivariate density functions formed by mixture models from univariate functions of the type $\exp(-|x|^\beta)$ for modeling acoustic feature vectors used in automatic recognition of speech.

According to the invention, the parameter $\beta$ is used to measure the non-Gaussian nature of the data. In the practice of the invention, $\beta$ is estimated from the data using a maximum likelihood criterion. Among other things, there is a balance between $\beta$ and the number of data points N that must be satisfied for efficient estimation. The computer implemented method for automatic machine recognition of speech iteratively refines parameter estimates of densities comprising mixtures of power exponential distributions whose parameters are means ($\mu$), variances ($\sigma$), impulsivity numbers ($\alpha$) and weights (w). The iterative refining process begins by predetermining initial values of the parameters $\mu$, $\sigma$ and w. Then, $\hat{\mu}^l$, $\hat{\sigma}^l$ derived from the following equations $$\hat{\mu}_i^l = \frac{\sum_{k=1}^{N}\left(\sum_{j=1}^{d}\frac{(x_j^k - \hat{\mu}_j^l)^2}{\hat{\sigma}_j^l}\right)^{\hat{\alpha}^l/2-1} A_{lk} x_i^k}{\sum_{k=1}^{N}\left(\sum_{j=1}^{d}\frac{(x_j^k - \hat{\mu}_j^l)^2}{\hat{\sigma}_j^l}\right)^{\hat{\alpha}^l/2-1} A_{lk}} \text{ and}$$

$$\hat{\sigma}_i^l = \frac{\hat{\alpha}^l \gamma_d(\hat{\alpha}^l)^{\hat{\alpha}^l/2} \sum_{k=1}^{N}\left(\sum_{j=1}^{d}\frac{(x_j^k - \hat{\mu}_j^l)^2}{\hat{\sigma}_j^l}\right)^{\hat{\alpha}^l/2-1} A_{lk}(x_i^k - \hat{\mu}_i^l)^2}{A_l}$$

for i=1, . . . ,d and l=1, . . . ,m. Then $\sigma$ is updated by assuming that $\theta=(\mu,\sigma,\alpha)$, $\hat{\theta}=(\hat{\mu},\hat{\sigma},\hat{\alpha})$ and letting $H(\mu,\sigma)=E_{\hat{\theta}}(\log f(\cdot|\theta))$, in which case H has a unique global maximum at $\mu=\hat{\mu}$, $\sigma=\hat{\sigma}$ where $$\beta(\alpha, \hat{\alpha}) = \left\{\frac{\alpha\Gamma\left(\frac{\alpha+1}{\hat{\alpha}}\right)}{\Gamma\left(\frac{1}{\hat{\alpha}}\right)}\right\}^{\frac{2}{\hat{\alpha}}} \frac{\Gamma\left(\frac{3}{\alpha}\right)\Gamma\left(\frac{1}{\hat{\alpha}}\right)}{\Gamma\left(\frac{3}{\hat{\alpha}}\right)\Gamma\left(\frac{1}{\alpha}\right)}$$

The l dimension is set by $\mu^l=\hat{\mu}^l$, $\sigma^l=\hat{\sigma}^l$, and $\alpha^l=\hat{\alpha}^l$. Finally, the convergence of a log likelihood function B($\alpha$) of the parameters is determined in order to get final values of $\mu$, $\sigma$ and $\alpha$. The B($\alpha$) is $$B(\Lambda, \hat{w}, \hat{\Lambda}) = \sum_{l=1}^{m} B^l(\Lambda, \hat{w}, \hat{\Lambda})$$

where $$B^l(\Lambda, \hat{w}, \hat{\Lambda}) = \sum_{k=1}^{N} A_{lk}\left(\frac{1}{2}\left(\sum_{i=1}^{d}\log\sigma_i^l\right) + \log p_d(\alpha^l) - (\gamma_d(\alpha^l))^{\alpha^l/2}\left(\sum_{i=1}^{d}\frac{(x_i^k - \mu_i^l)^2}{\sigma_i^l}\right)^{\alpha^l/2}\right).$$

BRIEF DESCRIPTION OF THE DRAWINGS

The file of this patent contains at least one drawing executed in color. Copies of this patent with color drawing (s) will be provided by the Patent and Trademark Office upon request and payment of the necessary fee.

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
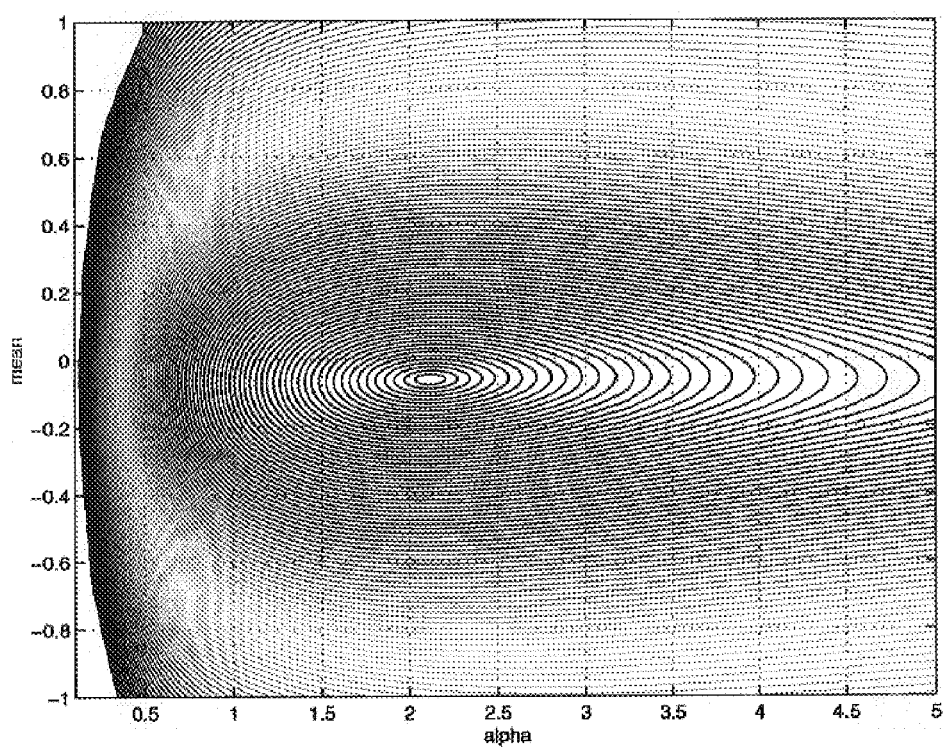
FIG. 1 is a graph showing the plot of average log-likelihood for $-1<\mu<1$ and $0<\alpha<5$.

For the specific problem of automatic machine recognition of speech as considered by S. Basu and C. Micchelli, supra, preliminary attempts were made to find the "best" value of $\alpha$ by running the speech recognizer for several different values of $\alpha$ and then choosing the value of $\alpha$ corresponding to the lowest word recognition error. The choice of recognition accuracy as the optimality criterion for $\alpha$ is dictated by the practical need for best recognizer. While other criteria for recognition accuracy (e.g., error rates based on phonemes, syllables or at a more detailed level of grannularity, the classification accuracy of feature vectors) can be thought of, we are primarily concerned with automated methods of finding an optimal value of the parameter $\alpha$.

In the general context of multivariate mixture densities, this is a difficult task; therefore, the description which follows is restricted to the case of modeling univariate data with one mixture component of this form. In this setting, we present an assortment of iterative formulas for estimating the parameter $\alpha$ from the data, and study their numerical performance. For mixtures of multivariate $\alpha$-densities, we resort to a technique arising in the context of EM estimation methodology. Recall from S. Basu and C. A. Micchelli, supra, and Christopher M. Bishop, supra, that the increase in the log-likelihood is bounded from below (via Jensen's inequality) by a term (often referred to as the Q-function in the EM literature) that can be conveniently maximized via optimization techniques. In the case of the present invention, we carry out the maximization with respect to the extra parameter $\alpha$. In this regard, we take advantage of the special dependency of Q on $\alpha$. Moreover, we extend this method to include modeling data by using mixture components each having different values of $\alpha$.

Our experimental results in the context for modeling acoustic feature vectors for the recognition of speech indicate that optimal values of $\alpha$ are smaller than one. In this way, we further substantiate the non-Gaussian form of the mixture components for modeling of speech feature vectors in acoustic space.

Maximum Log-likelihood

Let $T=\{x_1, x_2, \ldots, x_N\} \subset R^d$ be independent samples from a probability density function p. Then, the likelihood function of the data is $$\prod_{k=1}^{N} p(x^k).$$

Assume that the data comes from a parametric family $p(\cdot|\lambda)$, $\lambda \in \Omega \subset R^q$ of probability densities. Maximum likelihood estimation (MLE) method demands that the log-likelihood $$L_N(\lambda) = \sum_{i=1}^{N} \log p(x^i \mid \lambda) \quad (6)$$

as a function of $\lambda$ is made as large as is practical. This specifies a data dependent choice of $\lambda$ and hence a density function to model the data. When N is large and the data is selected as random samples from the density $p(\cdot \mid \theta)$, the quantity $1/NL_N$ approaches $$E_\theta(\log p(\cdot \mid \lambda)). \quad (7)$$

By Jensen's inequality $$E_\theta\{\log p(\cdot \mid \lambda)\} - E_\theta\{\log p(\cdot \mid \theta)\} = E_\theta\left\{\log \frac{p(\cdot \mid \lambda)}{p(\cdot \mid \theta)}\right\}$$
$$\geq \log \int_{R^d} \frac{p(x \mid \lambda)}{p(x \mid \theta)} p(x \mid \theta) dx$$
$$= 0$$

Therefore, the global maximum of (7) occurs for $\lambda=\theta$. We add to this fact by observing if equality occurs above, i.e., $$E_\theta\{\log p(\cdot \mid \lambda)\} = E_\theta\{\log p(\cdot \mid \theta)\}, \quad (8)$$

then $p(x|\lambda)=p(x|\theta)$, a.e., $x \in R^d$ (provided every member of the family vanishes on sets of measure zero). Thus, whenever any probability density in our family determines its parameter uniquely, we conclude that $\lambda=\theta$ is the unique global maximum of the function in (7). In particular, the family of elliptical densities of the type (6) have this property. We might add that there are parametric families of importance in applications for which the density does not determine its parameters, for example mixture models of Gaussians.

In the remainder of this section, we improve upon these facts univariate densities of the form $$f(t) = \frac{\rho}{\sqrt{\sigma}} \exp\left(-h\left(\gamma \frac{(t-\hat{\mu})^2}{\sigma}\right)\right), t \in R,$$

where $$\gamma = \frac{\int_{R_+} t^{\frac{1}{2}} \exp(-h(t)) dt}{\int_{R_+} t^{-\frac{1}{2}} \exp(-h(t)) dt} \quad \text{and} \quad (9)$$

$$\rho = \frac{\left(\int_{R_+} t^{\frac{1}{2}} \exp(-h(t)) dt\right)^{\frac{1}{2}}}{\left(\int_{R_+} t^{-\frac{1}{2}} \exp(-h(t)) dt\right)^{\frac{3}{2}}}. \quad (10)$$

For this class of densities, our parameter space consists of the mean $\mu \in R$, the variance $\sigma \in R_+$ and the function h. We use the notation $\theta=(\mu,\sigma,h)$ to denote the parameters that determine this density which we now denote by $f(\cdot \mid \theta)$.

Lemma 1 Let $\theta=(\mu,\sigma,h)$, $\hat{\theta}=(\hat{\mu},\hat{\sigma},\hat{h})$ and suppose h and $\hat{h}$ are increasing functions of $R_+$. Then, the function $F(\mu)=E_{\hat{\theta}}(\log f(\cdot \mid \theta))$ has a unique local maximum at $\mu=\hat{\mu}$.

Proof: Direct computation confirms the equation.

$$F(\mu) = \log \rho - \frac{\log \sigma}{2} - \int_{+\infty}^{+\infty} h\left(\frac{\gamma(t-\mu)^2}{\sigma}\right) \frac{\rho}{\sqrt{\hat{\sigma}}} \exp\left(-\hat{h}\left(\frac{\hat{\gamma}(t-\hat{\mu})^2}{\hat{\sigma}}\right)\right) dt.$$

To prove the claim, we show that $F'(\mu)$ is negative for $\mu > \hat{\mu}$. To this end, we observe that $$F'(\mu) = \frac{2\gamma\hat{\rho}}{\sigma\sqrt{\hat{\sigma}}} \int_0^\infty t h'\left(\gamma \frac{t^2}{\sigma}\right) [g((t-\mu+\hat{\mu})^2) - g((t-\hat{\mu}+\mu)^2)] dt,$$

where $$g(t) := \exp\left(-\hat{h}\left(\hat{\gamma}\frac{t}{\hat{\sigma}}\right)\right) t \in R.$$

Let us first point out that $F'(\mu)<0$ for $\mu > \hat{\mu}$. This claim follows by noting that $(y-\mu+\hat{\mu})^2 < (y+\mu-\hat{\mu})^2$ when $\mu > \hat{\mu}$ and $y>0$ and that $g(\cdot)$ is a decreasing function.

Lemma 2 Let $\theta=(\mu,\sigma,h)$, $\hat{\theta}=(\hat{\mu},\hat{\sigma},\hat{h})$. Suppose that h(x) and xh'(x) are increasing functions of x for x>0. Then the function $F(\mu,\sigma)=E_{\hat{\theta}}(\log f(\cdot \mid \theta))$ has a unique global maximum at $\mu=\hat{\mu}$, $\sigma=\hat{\sigma}$.

Proof: In Lemma 1, we proved that for any $\sigma$ the function $F(\cdot,\sigma)$ is maximized for $\mu=\hat{\nu}$. Thus, it suffices to consider the function $G:=F(\hat{\mu},\cdot)$. The function has the form $$G(\sigma) = \log \rho - \frac{\log \sigma}{2} - 2\rho \int_0^\infty h\left(\gamma \frac{\hat{\sigma}}{\sigma} y^2\right) \exp(h(\gamma y^2)) dy, \sigma \in R_+$$

Alternatively, we have the equation $$G(\sigma) = \log \rho + \log \phi - \frac{1}{2} \log \hat{\sigma} - 2\rho \int_0^\infty \tilde{h}(\phi y) \exp(-\tilde{h}(y)) dy.$$

where $\tilde{h}(y):=h(\gamma y^2)$, $y \in R_+$ and $$\phi = \sqrt{\frac{\hat{\sigma}}{\sigma}}.$$

Therefore, we obtain $$G'(\sigma) = -\frac{x^3}{2\hat{\sigma}}\left\{\frac{1}{x} - 2\rho \int_0^\infty y\tilde{h}'(xy)\exp(-\tilde{h}(y)) dy\right\}. \quad (11)$$

Moreover, using integration by parts, we get $$2\rho \int_0^\infty y\tilde{h}'(y)\exp(-\tilde{h}(y)) dy = 2\rho \int_0^\infty y \frac{d}{dy}(\exp(-\tilde{h}(y))) dy \quad (12)$$
$$= 2\rho \int_0^\infty \exp(-\tilde{h}(y)) dy$$
$$= \rho \int_{-\infty}^\infty \exp(-\tilde{h}(y)) dy$$
$$= 1$$

Combining these two equations, we have that $$G'(\sigma) = -\frac{\rho x^2}{\hat{\sigma}} \int_0^\infty \exp(-\tilde{h}(y))\{y\tilde{h}'(y) - xy\tilde{h}'(xy)\}.$$

By hypothesis, we conclude that $(y\tilde{h}'(y)-xy\tilde{h}'(xy))$ is negative if $x>1$ and, positive if $x<1$. This implies that $G'(\sigma)$ is negative if $\sigma>\hat{\sigma}$ and $G'(\sigma)$ is positive if $\sigma<\hat{\sigma}$ thereby proving the claim.

The next result is restricted to the family of functions $$h(t) = t^{\alpha/2}, \alpha > 0 \, t \in R_+$$

In this case, our parameter vector has the form $\theta=(\mu,\sigma,\alpha)$. To state the next result, we observer that the constants in equations (9) and (10) are given by $$\gamma(\alpha) = \frac{\Gamma(3/\alpha)}{\Gamma(1/\alpha)} \text{ and } \rho(\alpha) = \frac{\alpha\Gamma^{1/2}(3/\alpha)}{2\Gamma^{3/2}(1/\alpha)}. \tag{13}$$

Lemma 3 Suppose that $\theta=(\mu,\sigma,\alpha)$, $\hat{\theta}=(\hat{\mu},\hat{\sigma},\hat{\alpha})$. Let $H(\mu,\sigma)=E_\theta(\log f(\cdot|\theta))$. Then H has a unique global maximum at $\mu=\hat{\mu}$, $\sigma=\hat{\sigma}$ where $$\beta(\alpha, \hat{\alpha}) = \left\{\left(\frac{\alpha\Gamma\left(\frac{\alpha+1}{\hat{\alpha}}\right)}{\Gamma\left(\frac{1}{\hat{\alpha}}\right)}\right)^{\frac{2}{\hat{\alpha}}} \frac{\Gamma\left(\frac{3}{\alpha}\right)\Gamma\left(\frac{1}{\hat{\alpha}}\right)}{\Gamma\left(\frac{3}{\hat{\alpha}}\right)\Gamma\left(\frac{1}{\alpha}\right)}\right\}$$

Proof: It follows from Lemma 1 that for any $\sigma>0$, the function $H(\cdot,\sigma)$ is maximized for $\mu=\hat{\mu}$. Furthermore, by following the proof of Lemma 2, we get $$H(\hat{\mu}, \sigma) = \log\rho(\alpha) - \frac{1}{2}\log\sigma(\alpha) - \frac{2\rho(\hat{\alpha})}{\gamma(\hat{\alpha})^{1/2}} \int_0^\infty \left(\frac{\gamma\hat{\alpha}}{\gamma(\hat{\alpha})\sigma}t^2\right)^{\alpha/2} \exp(-t^{\hat{\alpha}})dt.$$

Evaluating the above integral, we obtain the equation $$H(\hat{\mu}, \sigma) = \log\rho - \frac{1}{2}\log\sigma - \frac{2\rho\hat{\sigma}}{\gamma(\hat{\alpha})^{1/2}}\left(\frac{\gamma\hat{\alpha}}{\gamma(\hat{\alpha})\sigma}\right)^{\alpha/2} \frac{1}{\hat{\alpha}}\Gamma\left(\frac{\alpha+1}{\hat{\alpha}}\right).$$

We proceed by differentiating the function H with respect to $\sigma$.

$$\frac{dH(\hat{\mu},\sigma)}{d\sigma} = \frac{1}{\sigma}\left\{-\frac{1}{2} + \frac{\alpha}{\hat{\alpha}}\frac{\rho(\hat{\alpha})}{\gamma(\hat{\alpha})^{1/2}}\left(\frac{\gamma\hat{\alpha}}{\gamma(\hat{\alpha})\sigma}\right)^{\alpha/2}\Gamma\left(\frac{\alpha+1}{\hat{\alpha}}\right)\right\}$$

It is now easily verified that $$\frac{dH(\hat{\mu},\sigma)}{d\sigma} = \begin{cases} < 0, & \text{if } \sigma > \beta(\alpha,\hat{\alpha})\hat{\sigma} \\ > 0, & \text{if } \sigma < \beta(\alpha,\hat{\alpha})\hat{\sigma} \end{cases}$$

Thus, $\sigma=\psi(\alpha)\hat{\sigma}$ is the global maximum of the function $H(\hat{\mu},\cdot)$.

Remark: Note that we have $\beta(\alpha,\hat{\alpha}))=1$.

To prove the main result of the section, we need a fact about the gamma function. As we will need to differentiate $\log \Gamma(x)$, we introduce the notation $$\Psi(x) = \frac{d}{dx}(\log\Gamma(x)) = \frac{\Gamma'(x)}{\Gamma(x)}$$

The function $\Psi(x)$ is known as the digamma function and $\Psi'(x)$ as the trigamma function. From M. Abramowitz and I. Stegan, *Handbook of Mathematical Statistics*, Dover Publications, New York, Ninth Dover printing (1972), the trigamma function has the representation $$\Psi'(x) = \sum_{n=0}^\infty \frac{1}{(x+n)^2} \text{ for } x > 0 \tag{14}$$

and satisfies $\Psi'(x)>0$ for $x>0$ and $$\Psi(x+1) = \frac{1}{x^2} + \Psi(x).$$

We shall use this in proving the following theorem.

Theorem 1 Suppose that $\theta=(\mu,\sigma,\alpha)$ and $\hat{\theta}=(\hat{\mu},\hat{\sigma},\hat{\alpha})$. Let $H(\mu,\sigma,\alpha)=E_{\hat{\theta}}\{f(\cdot|\theta)\}$. Then, H has a unique local maximum for $\mu=\hat{\mu}$, $\sigma=\hat{\sigma}$ and $\alpha=\hat{\alpha}$.

Proof: From Lemma 1 and Lemma 3, it suffices to consider $\mu=\hat{\mu}$ and $\alpha=\beta(\alpha,\hat{\alpha})\hat{\sigma}$.

We shall write $H(\alpha)$ for the expression $H(\hat{\mu},\beta(\alpha,\hat{\alpha})\hat{\sigma},\alpha)$ and get $$H(\alpha) = \log\rho - \frac{1}{2}\log\beta(\alpha,\hat{\alpha})\hat{\sigma} - \frac{2\hat{\rho}}{\hat{\alpha}\sqrt{\hat{\gamma}}}\left(\frac{\gamma\hat{\sigma}}{\beta(\alpha,\hat{\alpha})\hat{\gamma}\hat{\sigma}}\right)^{\alpha/2}\Gamma\left(\frac{\alpha+1}{\hat{\alpha}}\right).$$

We define $t=1/\alpha$, $\hat{t}=1/\hat{\alpha}$, $\overline{H}(t)=H(\alpha)$ and observe that $$\overline{H}(t) = -\log\Gamma(1+t) - t + t\log\Gamma(\hat{t}+t/\hat{t}) + t\log\Gamma(\hat{t}) + t\frac{1}{2}\log(\hat{\gamma}/\hat{\sigma}) - \log 2.$$

Our goal is to show that for every $\hat{t}>0$ the function $\overline{H}$ has a unique local maximum for $t>0$ at $t=\hat{t}$. Before doing so, let us observe that $$\lim_{t\to\infty} \overline{H}(t) = -\infty \tag{15}$$

for the proof of this claim, we invoke Stirling's formula (see Abramowitz and Stegan, supra)

$$\log \Gamma(t+1) = (t+\tfrac{1}{2})\log t - (t+1) + 1/2 \log 2\pi + O(1/t).$$

Substituting this relation into the definition of $\overline{H}$ we get $$\overline{H}(t) = -\left(\left(t+\frac{1}{2}\right)\log t - (t+1) + \frac{1}{2}\log 2\pi\right) - t + t\log -$$

$$\left(t\log\Gamma(\hat{t}) + t\frac{\hat{t}}{t}\Psi(\hat{t})\right) + t\log\Gamma(\hat{t}) + \frac{1}{2}\log\left(\frac{\hat{\gamma}}{\hat{\sigma}}\right) - \log 2 + O\left(\frac{1}{t}\right)$$

$$= -\frac{1}{2}\log t + 1 - \frac{1}{2}\log 2\pi - \hat{t}\Psi(\hat{t}) + \frac{1}{2}\log\left(\frac{\hat{\gamma}}{\hat{\sigma}}\right) - \log 2 + O\left(\frac{1}{t}\right).$$

from which (15) follows. Returning to our goal to show that $\overline{H}$ has a unique local maximum at $\bar{t}$, we compute the derivative $$\overline{H}^I(t) = -\Psi(t+1) + \frac{\hat{t}}{t}\Psi\left(\hat{t}+\frac{\hat{t}}{t}\right) + \log\left(\frac{t}{\hat{t}}\frac{\Gamma(\hat{t}+1)}{\Gamma\left(\hat{t}+\frac{\hat{t}}{t}\right)}\right)$$

from which we can see that $\overline{H}^I(\hat{t})=0$. The second derivative of $\overline{H}$ is given by $$\overline{H}^{II}(t) = \frac{1}{t} - \Psi^I(t+1) - \frac{\hat{t}^2}{t^3}\Psi^I\left(\hat{t}+\frac{\hat{t}}{t}\right). \quad (16)$$

We shall now demonstrate that the second drivative has a unique simple zero for t>0. The first step in this argument is to show that $\overline{H}^{II}$ is strictly negative for $t \in [0, 2\hat{t}]$. To this end, we require the following inequality $$\Psi^I(t) > \frac{1}{t} + \frac{1}{2t^2}, t > 0. \quad (17)$$

For the proof, we use the convexity of the function $t \to t^{+2}$ and the trapezoidal rule, which gives the estimate $$\sum_{n=0}^{\infty} \frac{1}{2}\left\{\frac{1}{(t+n)^2} + \frac{1}{(t+n+1)^2}\right\} \geq \sum_{n=0}^{\infty} \int_{t+n}^{t+n+1} \frac{1}{x^2} dx \quad (18)$$

$$= \int_{t}^{\infty} \frac{1}{x^2} dx$$

$$= \frac{1}{t}.$$

Substituting equation (14) into the above inequality yields the desired conclusion. Next, we use (17) and the expression (16) for $\overline{H}^{11}$ to obtain the inequality $$\overline{H}^{II}(t) \leq \frac{t - 2\hat{t}}{2t^2(t+1)}, t > 0.$$

This inequality is insufficient to prove the result. Further estimates for $H\Delta$ are required.

Maximum Likelihood Estimation

The preceding lemma indicates the possibility that $\mu=\hat{\mu}$, $\sigma=\hat{\sigma}$. and $\alpha=\hat{\alpha}$ may indeed be the global maximum for $H(\mu,\sigma,\alpha)$. We conjecture that this is the case. However, not knowing the true value of $\hat{\mu}$, $\hat{\sigma}$ and $\hat{\alpha}$ we can, of course, not compute $H(\mu,\sigma,\alpha)$ and are left with maximizing $$L(\mu, \sigma, \alpha) = \prod_{i=1}^{N} f(x^i; \mu, \sigma, \alpha).$$

This is equivalent to maximizing $$\frac{1}{N}\log L = \log \rho - \frac{1}{2}\log \sigma - \left(\frac{\gamma}{\sigma}\right)^{\alpha/2} \frac{1}{N} \sum_{i=1}^{N} |x^i - \mu|^{\alpha}.$$

One would expect that $1/N \log L(\mu,\sigma,\alpha) \approx H(\mu,\sigma,\alpha)$ and, therefore, that the maximum would occur at $\mu=\hat{\mu}$, $\sigma=\hat{\sigma}$ and $\alpha=\hat{\alpha}$ for large values of N. However, as we show later, $\max_{\mu,\sigma} 1/N \log L(\mu,\sigma,\alpha)$ goes to infinity as $\alpha \to 0$. Recall that this was not so for $H(\mu,\sigma,\alpha)$. One must therefore take care that the value of $\alpha$ does not become too small when seeking $$\frac{1}{N}\log L.$$

Towards showing this behavior of $$\frac{1}{N}\log L,$$

we find a lower bound for $$\max_{\mu,\sigma} \frac{1}{N}\log L(\mu, \sigma, \alpha).$$

Lemma 4 Let $$L_\sigma(\mu, \alpha) = \max_{\sigma \geq 0} \frac{1}{N}\log L(\mu, \sigma, \alpha). \text{ If } \sum_{i=1}^{N} |x^i - \mu|^\alpha > 0$$

then $$L_\sigma(\mu, \alpha) = \log\left(\frac{\alpha}{2}\right) - \frac{1}{\alpha}\log \alpha - \log\Gamma\left(\frac{1}{\alpha}\right) - \frac{1}{\alpha} - \frac{1}{\alpha}\log\left(\frac{1}{N}\sum_{i=1}^{N} |x^i - \mu|^\alpha\right) \quad (19)$$

Proof: Evaluating log L yields the expression $$\frac{1}{N}\log L(\mu, \sigma, \alpha) = \log \rho - \frac{1}{2}\log \sigma - \left(\frac{\gamma}{\alpha}\right)^{\frac{\alpha}{2}} \frac{1}{2} \sum_{i=1}^{N} |x^i - \mu|^\alpha.$$

Clearly, $$\frac{1}{N}\log L \to -\infty$$

as $\sigma \to 0$ and $\sigma \to \infty$. Since log L is continuously differentiable with respect to $\sigma$ for $0 < \sigma < \infty$, it follows that $$\frac{\partial}{\partial \sigma}\left[\left(\frac{1}{N}\log L\right)\right]_{\sigma=\sigma_0} = 0$$

at the maximizing value for $\sigma$, namely $\sigma_0$. Differentiating, we get:

$$\frac{\partial}{\partial \sigma}\left(\frac{1}{N}\log L\right) = -\frac{1}{2\sigma} + \frac{\alpha}{2\sigma}\left(\frac{\gamma}{\sigma}\right)^{\frac{\alpha}{2}} \frac{1}{N} \sum_{i=1}^{N} |x^i - \mu|^\alpha$$

Solving for $$\frac{\partial}{\partial \sigma}\left(\frac{1}{N}\log L\right) = 0$$

we get the equations $$\left(\frac{\gamma}{\sigma_0}\right)^{\frac{\alpha}{2}} \frac{1}{N} \sum_{i=1}^{N} |x^i - \mu|^\alpha = \frac{1}{\alpha} \text{ and} \quad (20)$$

-continued $$\sigma_0 = \gamma \left( \frac{\alpha}{N} \sum_{i=1}^{N} |x^i - \mu|^\alpha \right)^{\frac{2}{\alpha}} \quad (21)$$

We now have $$L_\sigma(\mu, \alpha) = \log \rho - \frac{1}{2} \log \sigma_0 - \left( \frac{\gamma}{\sigma_0} \right)^{\frac{\alpha}{2}} \frac{1}{N} \sum_{i=1}^{N} |x^i - \mu|^\alpha$$

Substituting in (20) we get that $$L_\sigma(\mu, \alpha) = \log \rho - \frac{1}{2} \log \sigma_0 - \frac{1}{\alpha}$$

and (21) gives $$L_\sigma(\mu, \alpha) = \log \left( \frac{\rho}{\sqrt{\gamma}} \right) - \frac{1}{\alpha} \log \left( \frac{\alpha}{N} \sum_{i=1}^{N} |x^i - \mu|^\alpha \right) \quad (22)$$

Equation (19) is then arrived at by using (13) and (22).

After maximizing over $\sigma$, one needs to maximize over $\mu$. The problem with maximizing over $\mu$, however, is that for $\alpha < 1$ the derivative with respect to $\mu$ of $1/N \log L(\mu, \sigma_0, \alpha)$ develops singularities at the data points and the maximum may occur at any of the data points as well as at value of $\mu$ satisfying $$\frac{d}{d\mu} \{ \log L(\mu, \sigma_0, \alpha) \} = 0.$$

We will show that if $\mu = x^j$ for some $j \in \{1, 2, \ldots, N\}$ then $\log L(x^j, \sigma_0, \alpha) \to \infty$ as $\alpha \to 0$. To achieve this, we must understand what happens to $$\frac{1}{\alpha} \log \left( \frac{1}{N} \sum_{i=1}^{N} |x^i - \mu|^\alpha \right) \text{ as } \alpha \to 0.$$

Now the arithmetic geometric inequality becomes and equality as $\alpha \to 0$, i.e., $$\lim_{\alpha \to 0} \left( \frac{1}{N} \sum_{i=1}^{N} |x^i - \mu|^\alpha \right)^{\frac{1}{\alpha}} = \prod_{i=1}^{N} |x^i - \mu|^{\frac{1}{N}}$$

if $|x^i - \mu| > 0$ for all $i = 1, 2, \ldots, N$ (see page 15 of G. Hardy, J. E. Littlewood and G. Polya, Inequalities, Cambridge Mathematical Library, 1991).

For small values of $\alpha$, the approximation $$\frac{1}{\alpha} \log \left( \frac{1}{N} \sum_{i=1}^{N} |x^i - \mu|^\alpha \right) = \frac{1}{N} \sum_{i=1}^{N} \log |x^i - \mu| + O(\alpha)$$

holds if $|x^i - \mu| > 0$ for $i = 1, 2, \ldots, N$, considering the more general case, where $\mu = x^j$ for some $i \in \{1, 2, \ldots, N\}$, we introduce the set $S = \{i : x_i \neq \mu_i, i \in \{1, 2, \ldots, N\}\}$. We then have $$\frac{1}{\alpha} \log \left( \frac{1}{N} \sum_{i=1}^{N} |x^i - \mu|^\alpha \right) = \frac{1}{\alpha} \log \left( \frac{1}{N} \sum_{i \in S} |x^i - \mu|^\alpha \right)$$

$$= \frac{1}{\alpha} \log \left( \frac{|S|}{N} \right) + \left( \frac{1}{|S|} \sum_{i \in S} \log |x^i - \mu|^\alpha \right) + O(\alpha)$$

Using this in addition to Lemma 4 we arrive at Lemma 5.

Lemma 5 For small values of $\alpha$ we have $$L_\sigma(\mu, \alpha) \geq \frac{1}{2} \log \alpha - \frac{1}{\alpha} \log \left( \frac{|S|}{N} \right) + \frac{1}{|\alpha|} \sum_{i \in S} \log |x^i - \mu| \frac{1}{2} \log \left( \frac{\pi}{2} \right) + O(\alpha)$$

where $S = \{i : x_i \neq \mu_i, i \in \{1, 2, \ldots, N\}\}$.

Proof: Stirling's formula tells us that $$\log \Gamma(z) = \left( z - \frac{1}{2} \right) \log(z) - z - \frac{1}{2} \log(2\pi) + O\left( \frac{1}{z} \right)$$

for large values of $z$. If $\alpha$ is small, we, therefore, have $$\log \Gamma \left( \frac{1}{\alpha} \right) = \left( \frac{1}{\alpha} - \frac{1}{2} \right) \log \left( \frac{1}{\alpha} \right) - \frac{1}{\alpha} - \frac{1}{2} \log(2\pi) + O(\alpha)$$

Together with the arithmetic-geometric connection this provides us $$L_\sigma(\mu, \alpha) = \log \left( \frac{\alpha}{2} \right) - \frac{1}{\alpha} \log(2\pi) - \frac{1}{\alpha} -$$

$$\left\{ \left( \frac{1}{\alpha} - \frac{1}{2} \right) \log \alpha - \frac{1}{\alpha} - \frac{1}{2} \log(2\pi) + O(\alpha) \right\} -$$

$$\left\{ \frac{1}{\alpha} \log \left( \frac{|S|}{N} \right) + \frac{1}{|S|} \sum_{i \in S} \log |x^i - \mu| + O(\alpha) \right\}$$

$$= \frac{1}{2} \log \alpha - \frac{1}{\alpha} \left( \frac{|S|}{N} \right) + \frac{1}{|S|} \sum_{i \in S} \log |x^i - \mu| +$$

$$\frac{1}{2} \log \left( \frac{\pi}{2} \right) + O(\alpha).$$

Clearly, if $\mu = x^i$ for some $i \in \{1, 2, 3, \ldots, N\}$ we have $|S| < N$. Thus, fixing $\mu = x_j$ we get $$L_\sigma(\mu, \alpha) \geq \frac{1}{2} \log \alpha - \frac{1}{\alpha} \log \left( 1 - \frac{1}{N} \right) + \frac{1}{|S|} \sum_{i \in S} \log |x^i - \mu| + \frac{1}{2} \log \left( \frac{\pi}{2} \right) + O(\alpha)$$

But $$\frac{1}{|S|} \sum_{i \in S} \log |x^i - \mu|$$

is independent of $\alpha$ and $\log \alpha$ is dominated by $$\frac{1}{\alpha} \log \left( 1 - \frac{1}{N} \right)$$

and so we see that $$L_\sigma(\mu, \alpha) \to \infty \text{ for } \alpha \to \infty.$$

This was not the case for $H(\mu, \sigma, \alpha)$. On the other hand we see that $-\frac{1}{\alpha}\log\left(1-\frac{1}{N}\right)$ starts to dominate $\frac{1}{N}L(\mu,\sigma,\alpha)$ when $$\frac{1}{2}\log\alpha - \frac{1}{\alpha}\log\left(1-\frac{1}{N}\right) > 0$$

We would like a rule of thumb that ensures that $$\frac{1}{\alpha}\log\left(1-\frac{1}{N}\right)$$

does not dominate. We pick $$\alpha = \frac{1}{N}$$

and evaluate $$\left.\frac{1}{2}\log\alpha - \frac{1}{\alpha}\log\left(1-\frac{1}{N}\right)\right|_{\alpha=\frac{1}{N}} = -\frac{1}{2}\log N + 1 + O\left(\frac{1}{N}\right)$$

But $-\frac{1}{2}\log N+1<0$ if $N>\exp(2)=7.3891$, so we can safely use the rule of thumb that $\alpha>1/N$ for our experience as we will mostly that $N\geq 8$.

We conclude this section by noting that the "optimal" choice of $\alpha$ is a local maximum of $1/N \log(\mu,\sigma,\alpha)$ for which $\alpha>1/N$.

Numerical Experiments

To verify the theory of preceding sections, we generated synthetic data from a standard Gaussian density, $x_i$, $i=1,2,\ldots,N$. Lemma 5 provides an explicit formula for $L_o(\mu,\alpha)$. Plotting this function for $\mu$ and $\sigma$ for our synthetic data, we expect to see a local maximum at $\mu=0$, $\sigma=2$ according to Theorem 1. Also, we expect the log-likelihood to go to infinity for small values of $\alpha$. We make plots of $L_o(\mu,\alpha)$ for values of $\mu$ and $\sigma$ around 0 and 2 respectively, and for small values of $\alpha$ (with $\alpha<1/N$).

Figure 2:
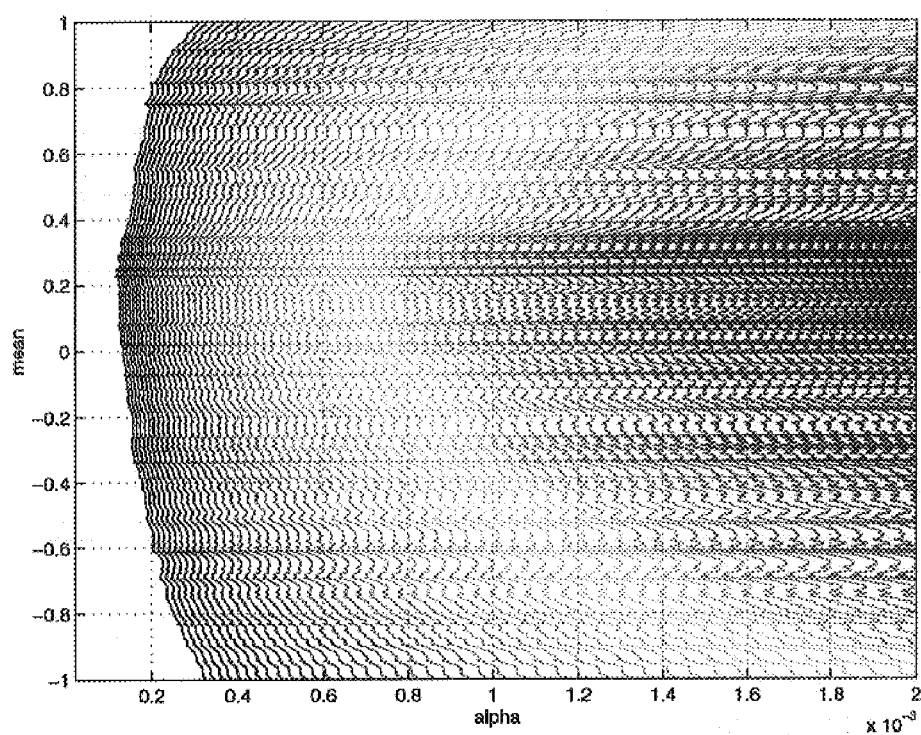
FIG. 2 is a graph showing the plot of average log-likelihood for $-1<\mu<1$ and $0<\alpha<0.002$.
Figure 3:
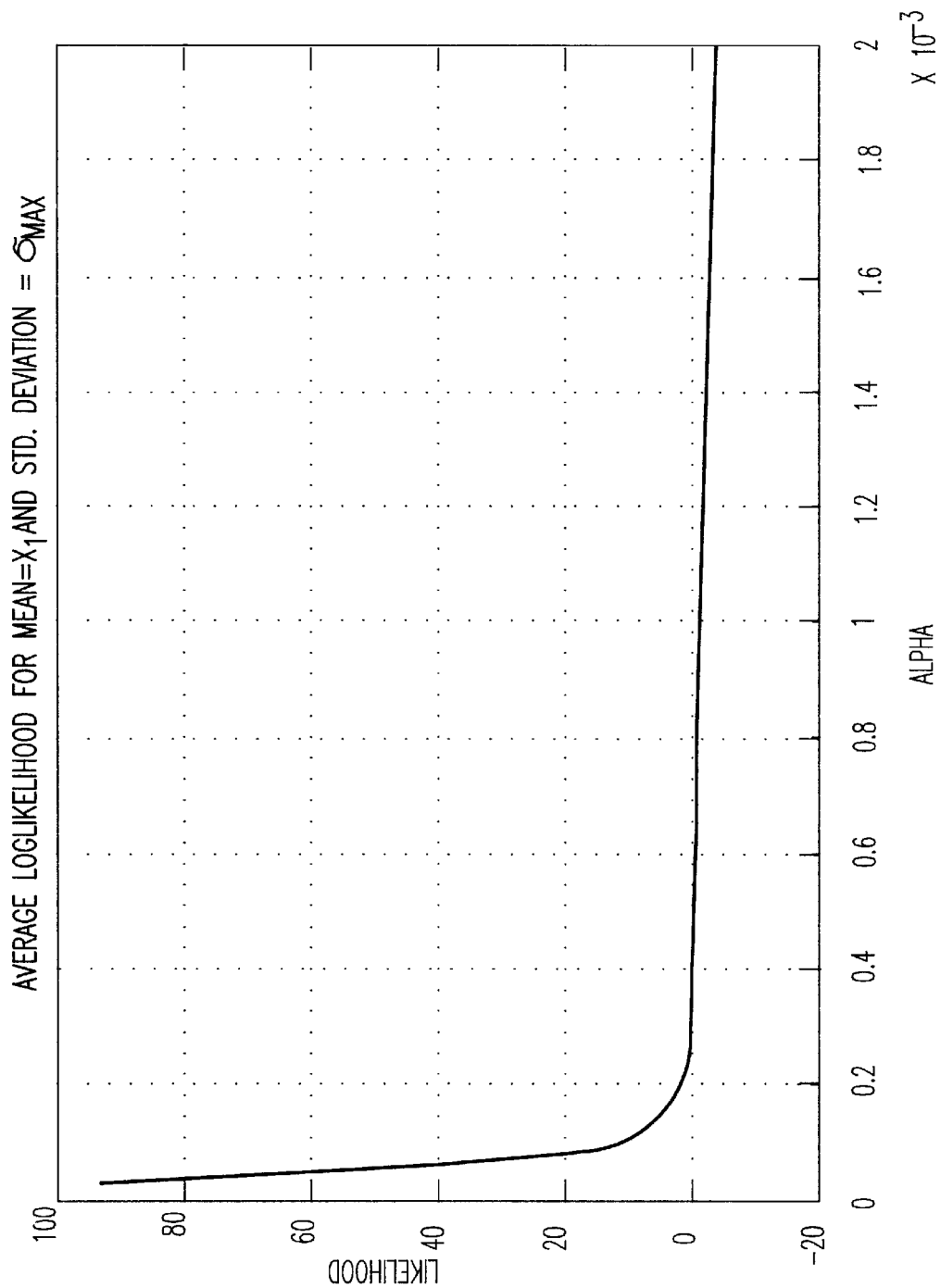
FIG. 3 is a graph showing the plot of $L_o(x_1,\alpha)$ for $0<\alpha<0.002$.
Figure 4:
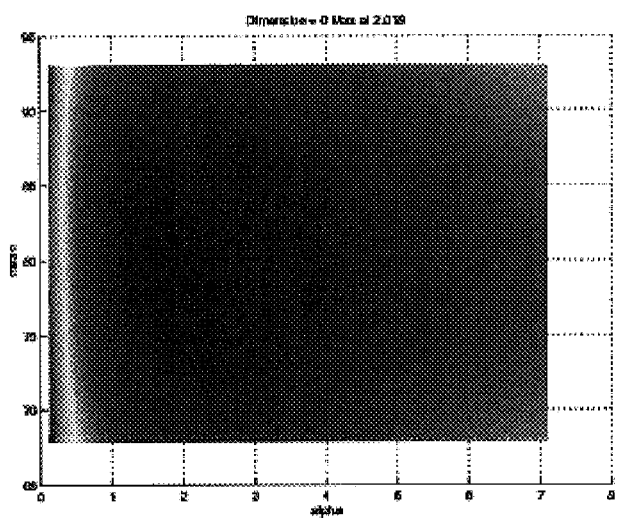
FIGS. 4 to 42 are plots of optimal $\alpha$ for dimensions 0–38, respectively, of leaf 513.
Figure 5:
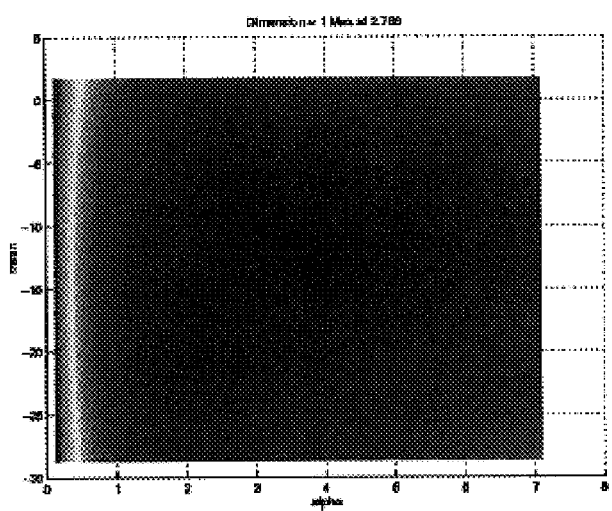
Figure 6:
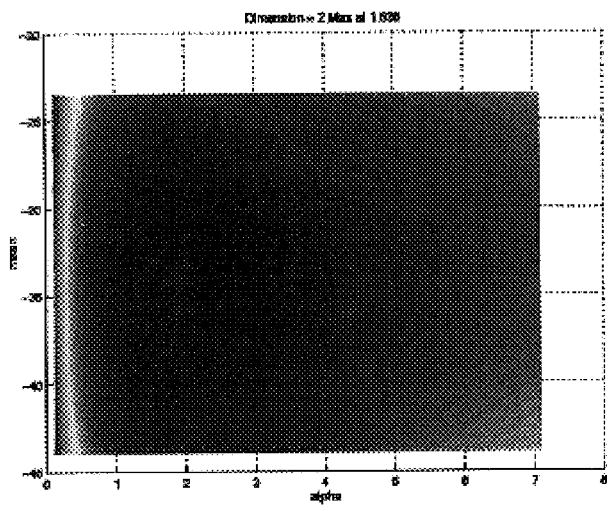
Figure 7:
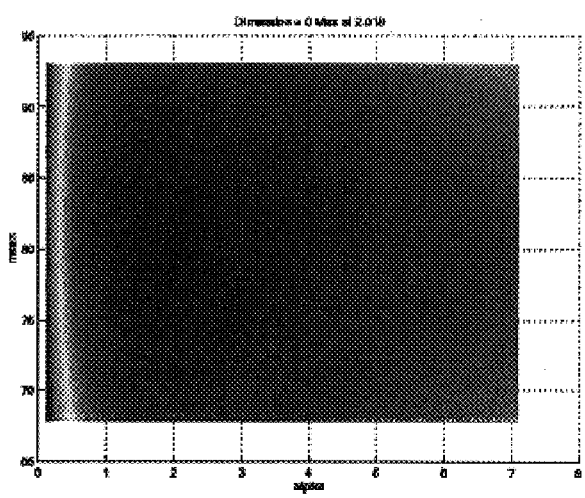
Figure 8:
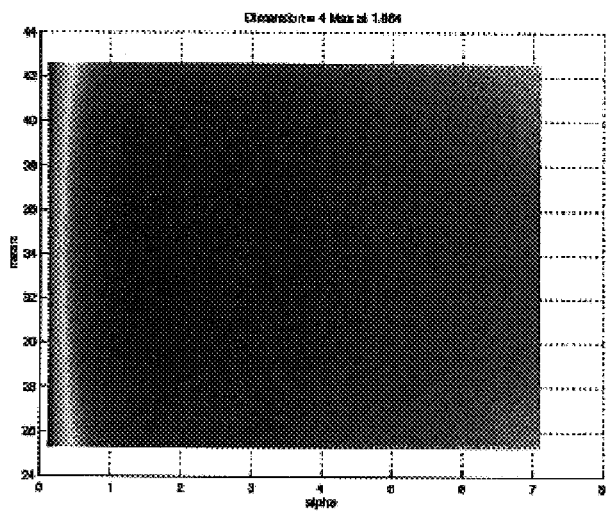
Figure 9:
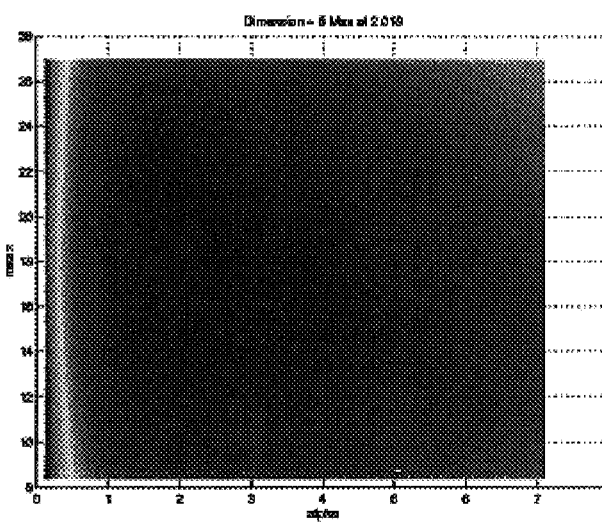
Figure 10:
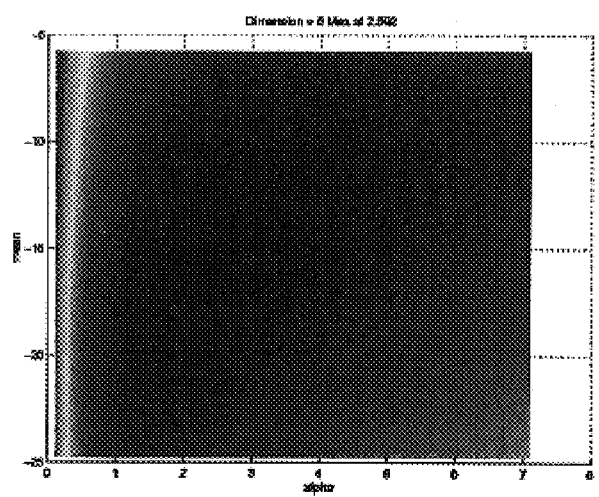
Figure 11:
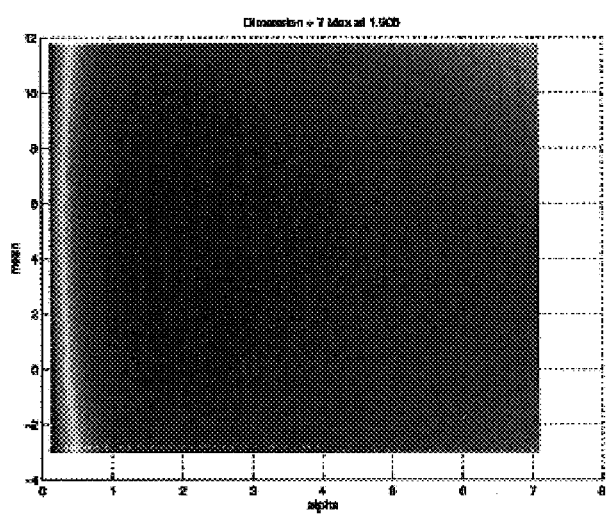
Figure 12:
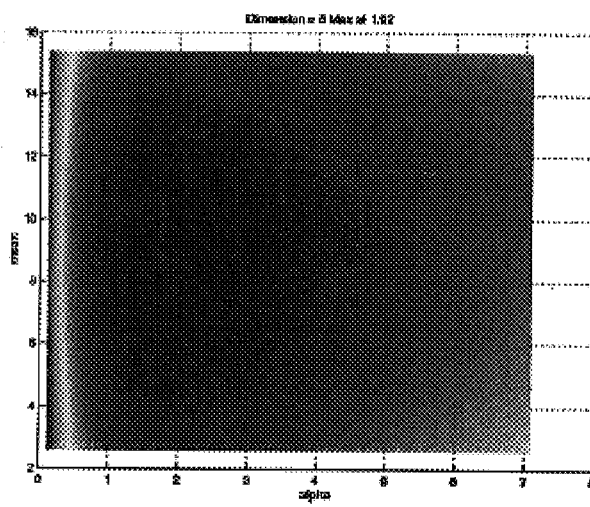
Figure 13:
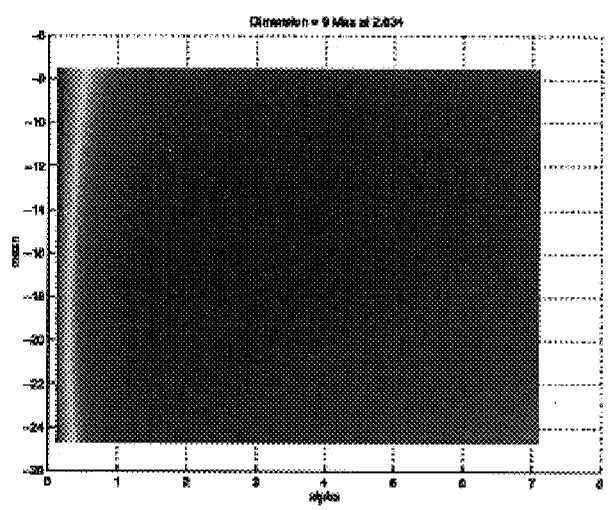
Figure 14:
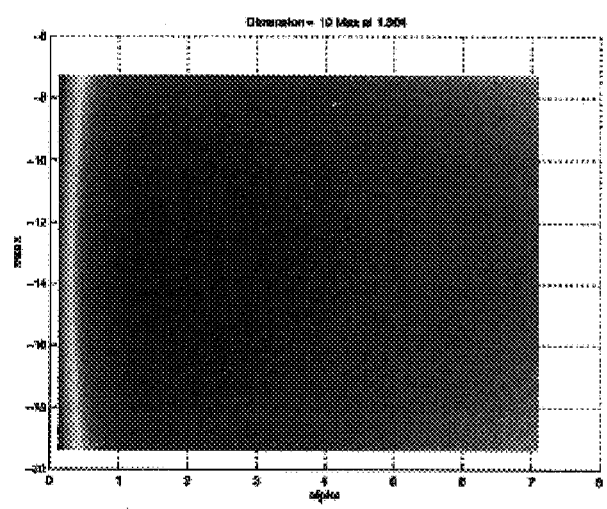
Figure 15:
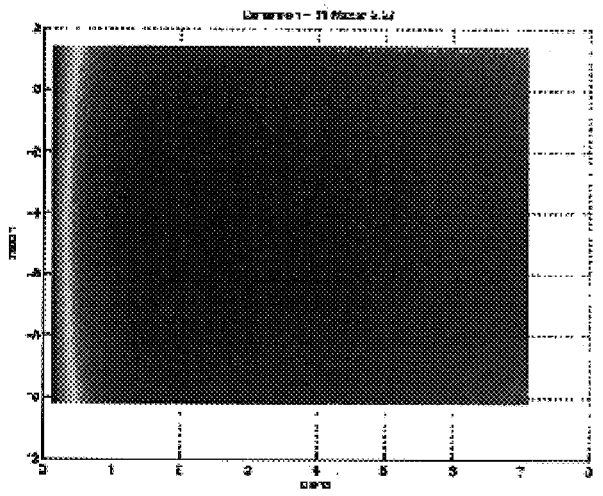
Figure 16:
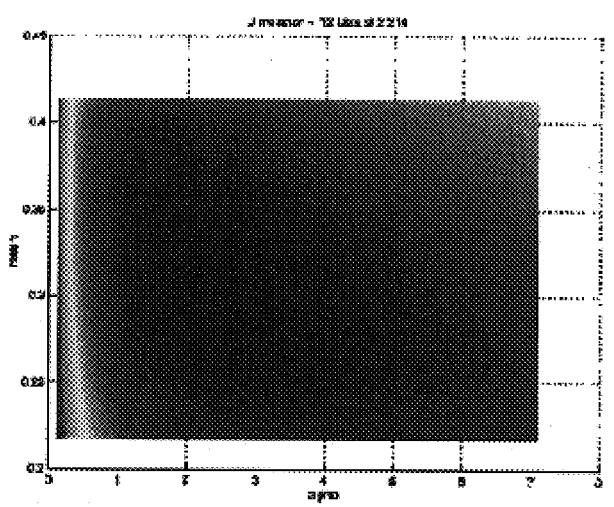
Figure 17:
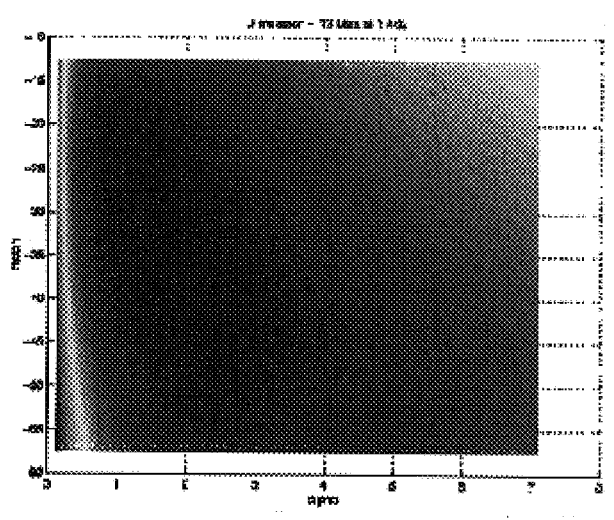
Figure 18:
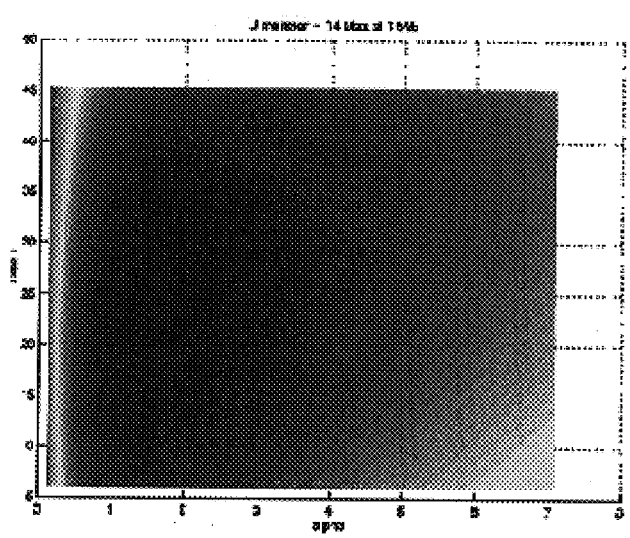
Figure 19:
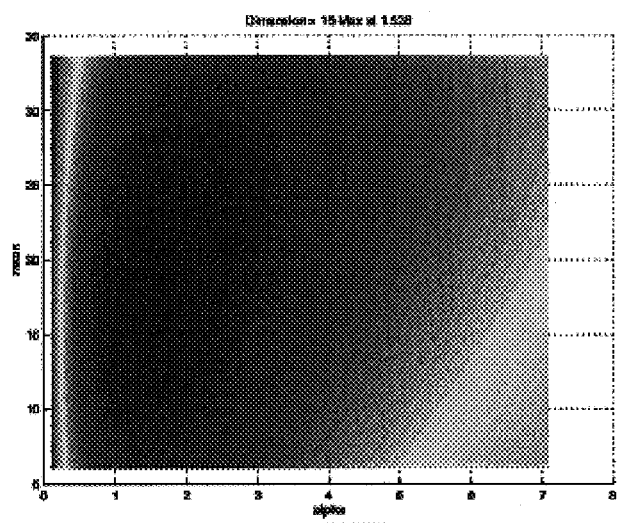
Figure 20:
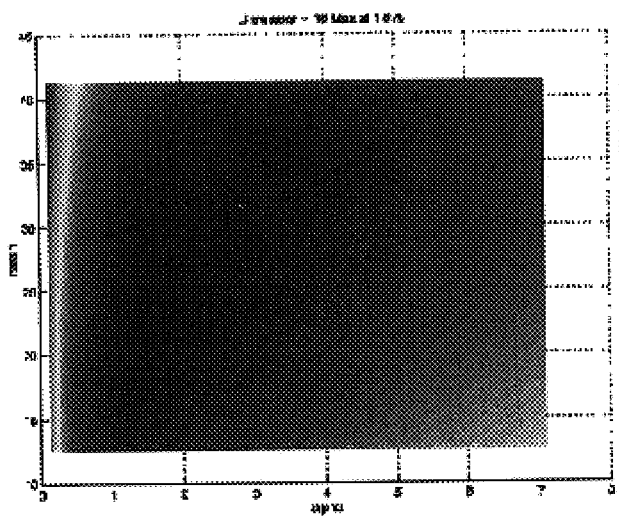
Figure 21:
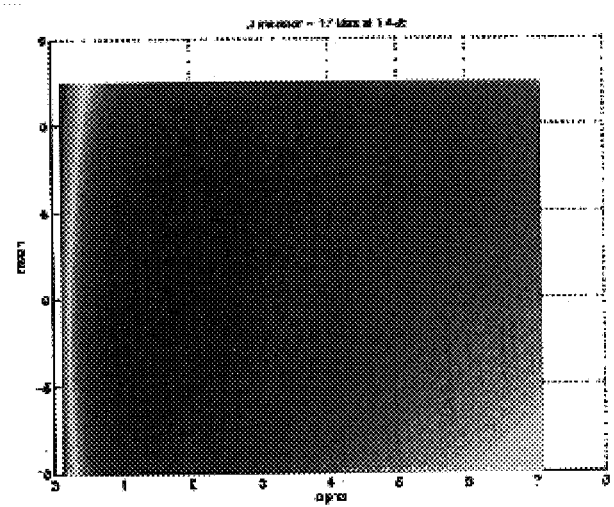
Figure 22:
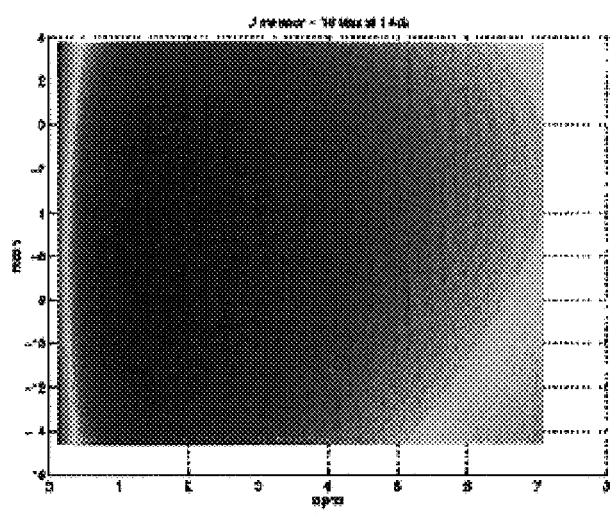
Figure 23:
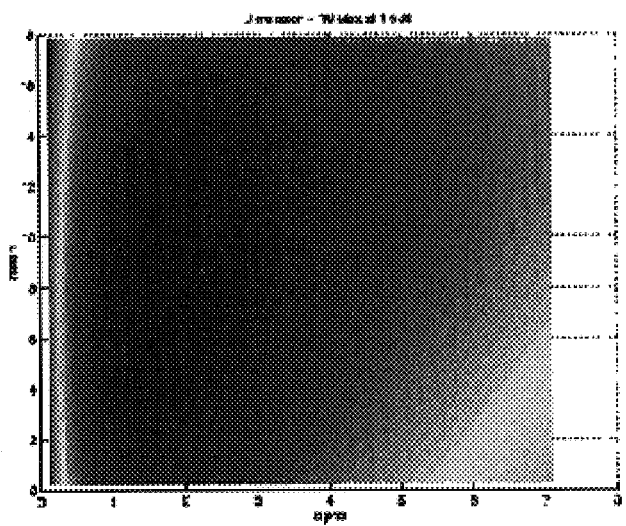
Figure 24:
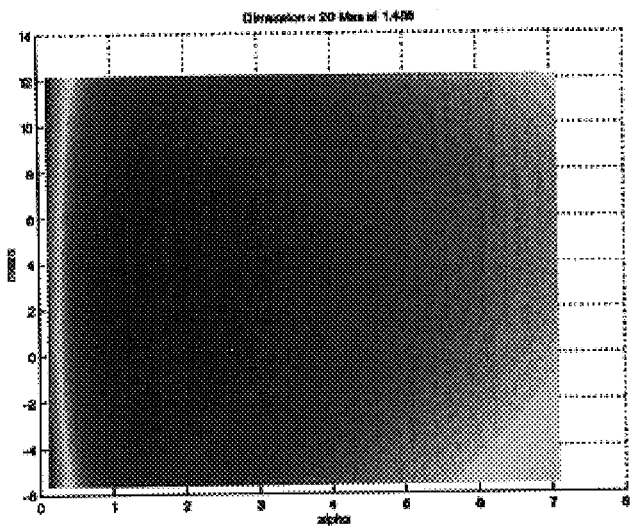
Figure 25:
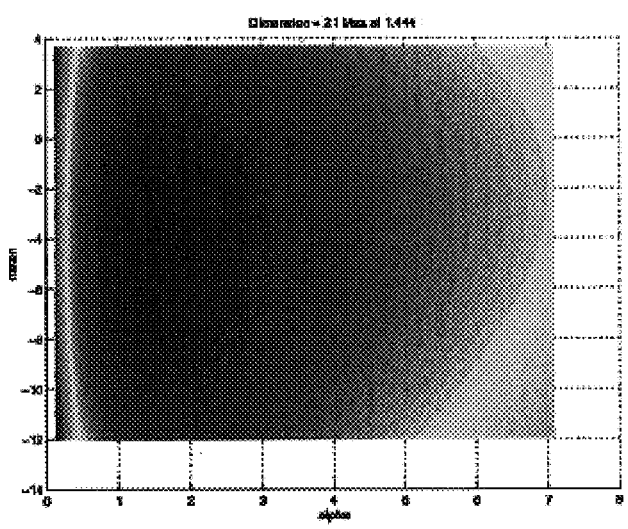
Figure 26:
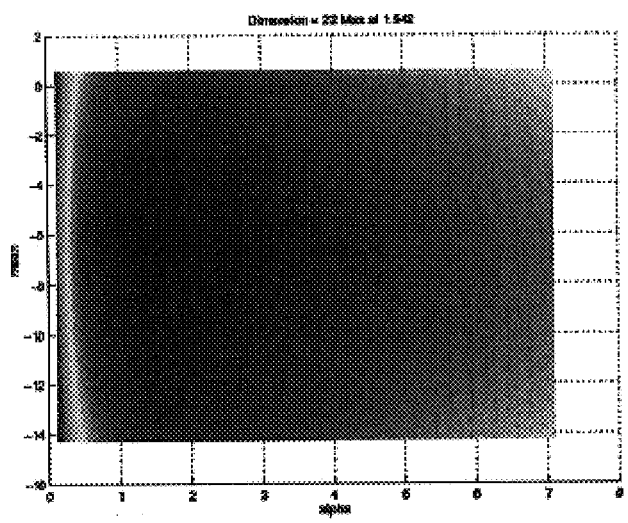
Figure 27:
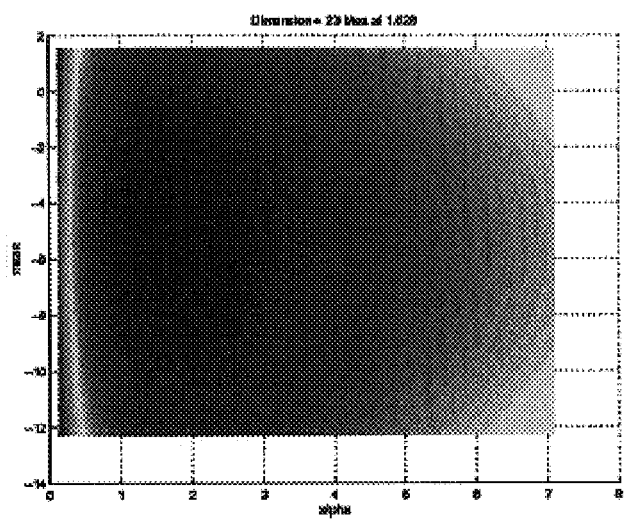
Figure 28:
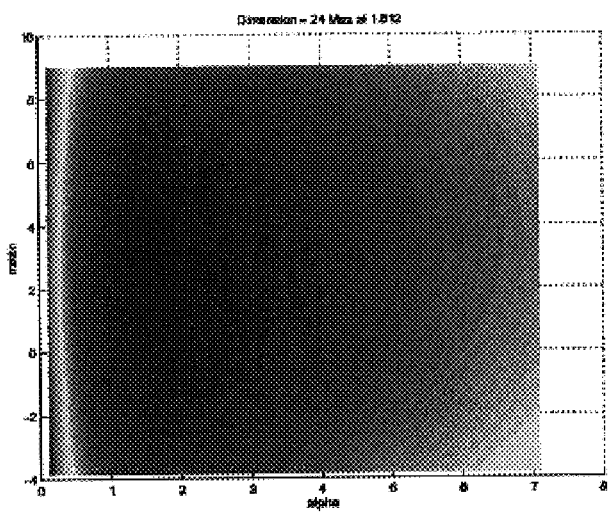
Figure 29:
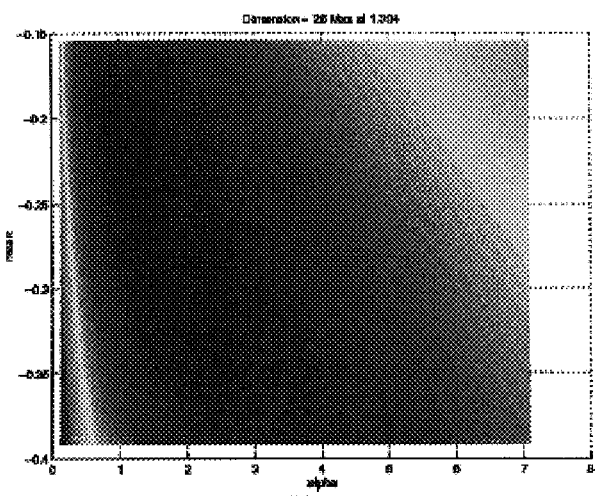
Figure 30:
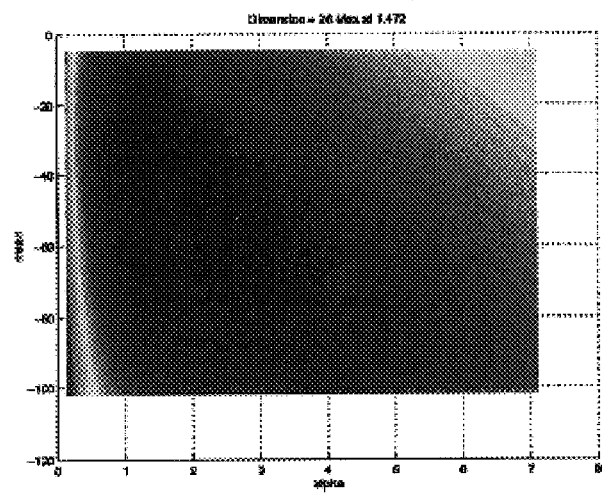
Figure 31:
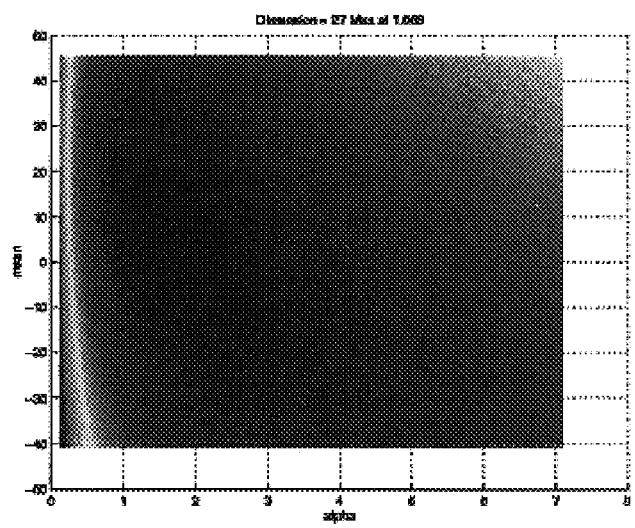
Figure 32:
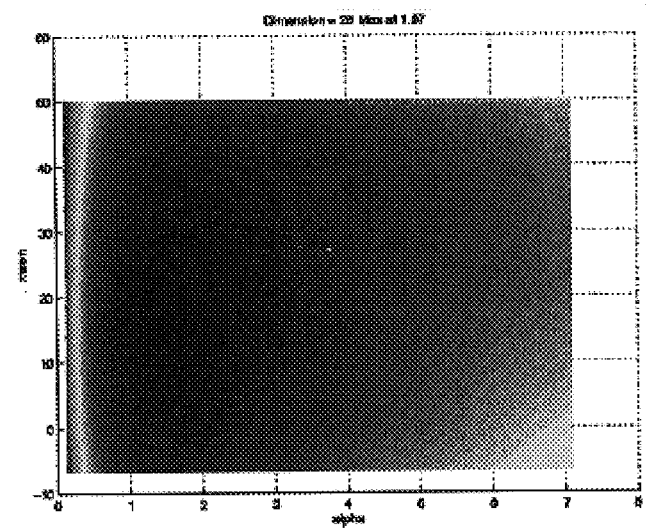
Figure 33:
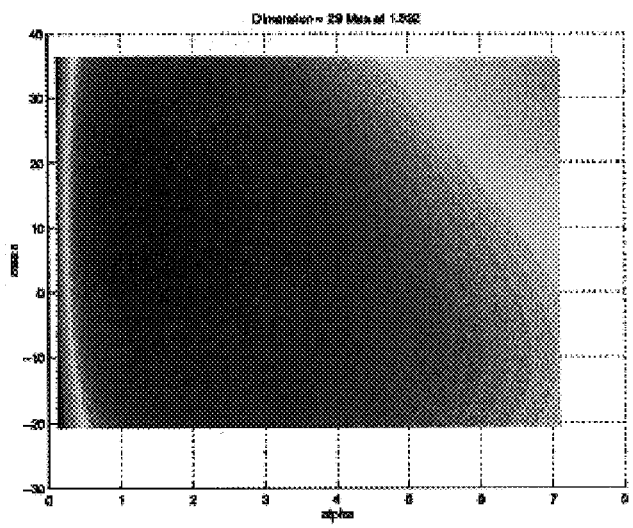
Figure 34:
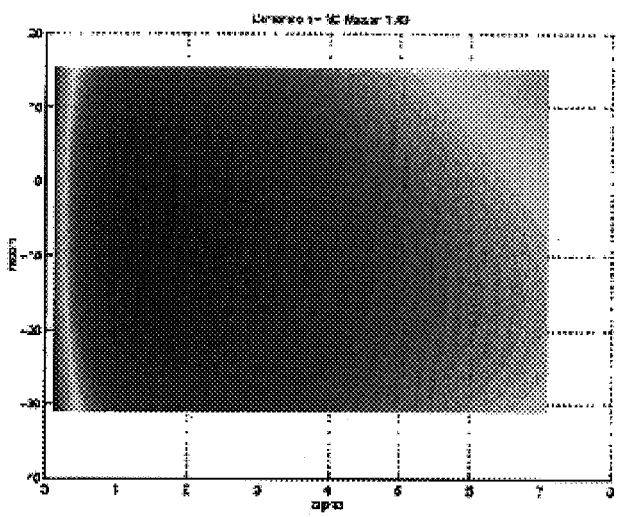
Figure 35:
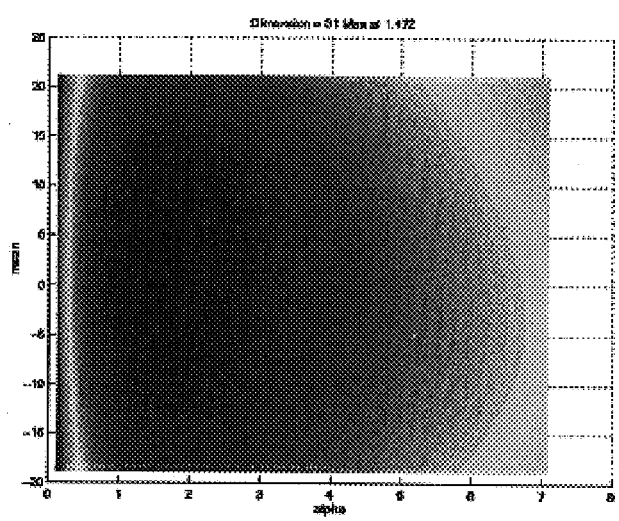
Figure 36:
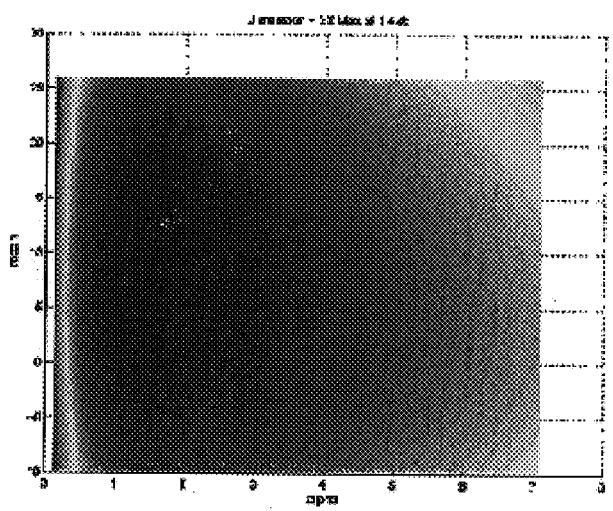
Figure 37:
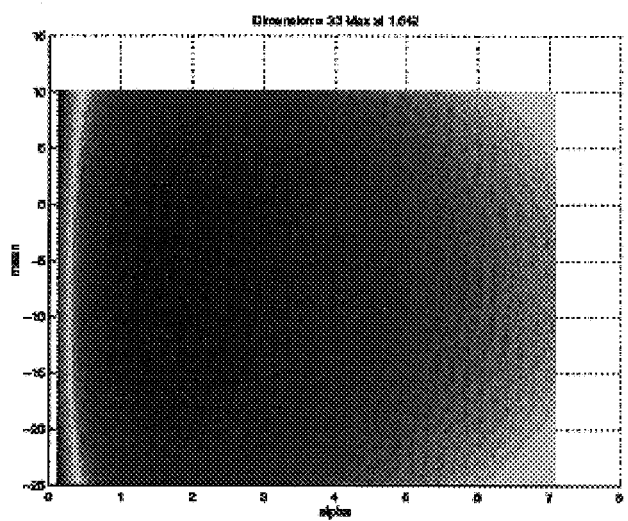
Figure 38:
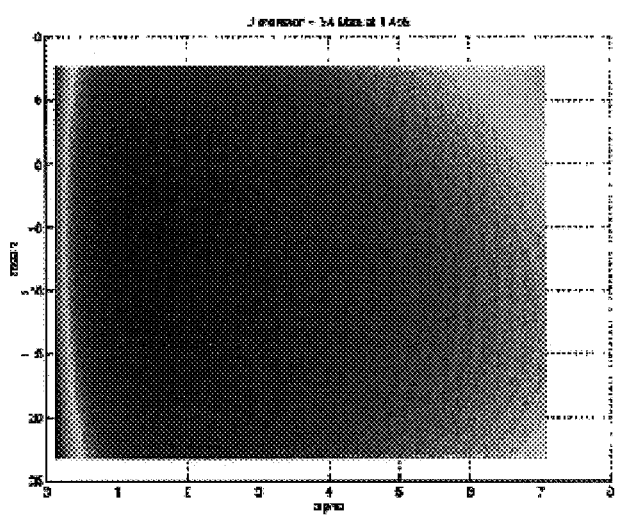
Figure 39:
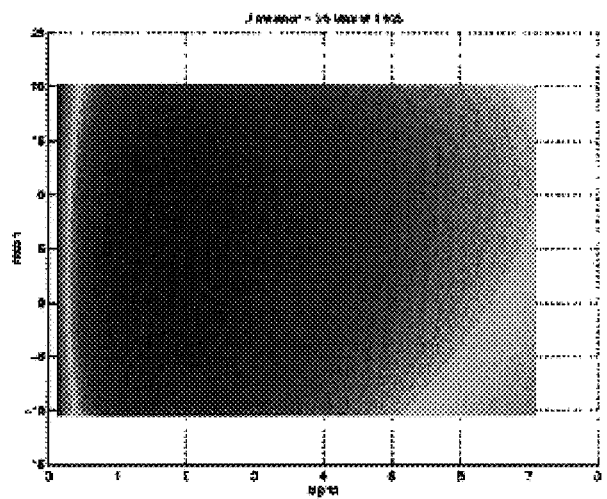
Figure 40:
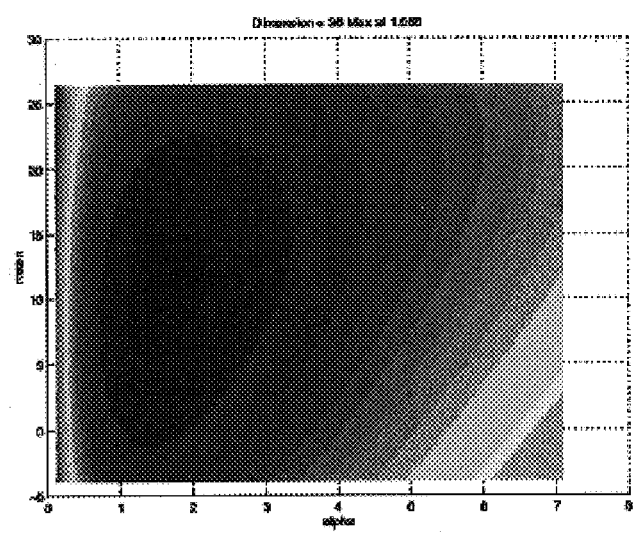
Figure 41:
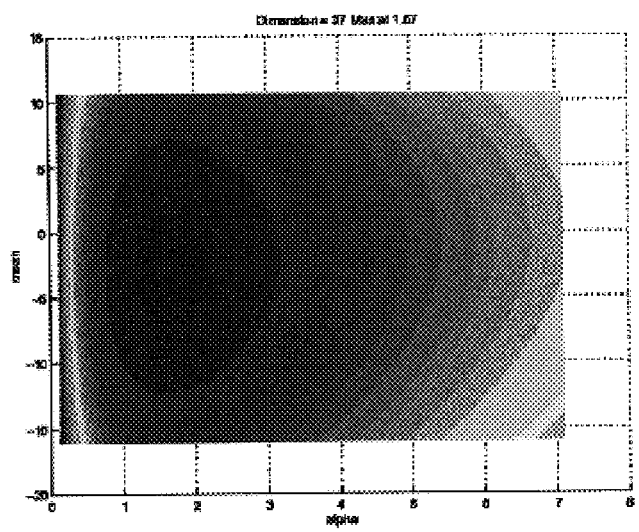
Figure 42:
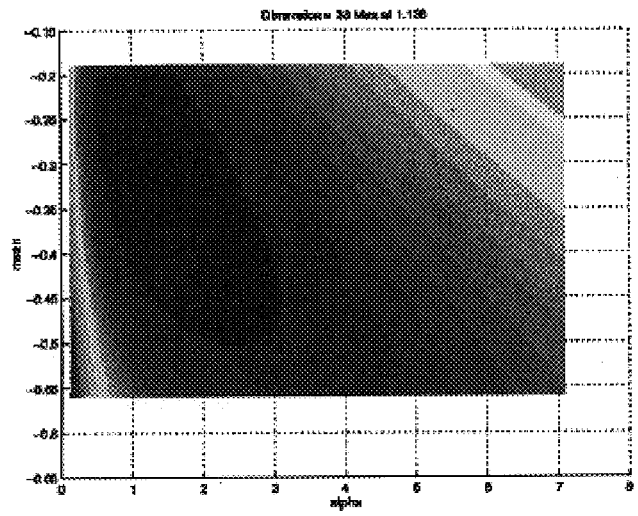

FIG. 1 and FIG. 2 illustrate these two points. Investigating the value of average log-likelihood in the figures, we find that the maximum likelihood in FIG. 1 is approximately $-1.3629$ and is attained for $\mu=-0.06$ and $\alpha=2.109$. In FIG. 2 the likelihood is $-3.9758$. This is not according to our intention. The reason for this is that FIG. 2 is generated on a rectangular grid, and the data points happen not to fall on the grid points. If we plot $L_o(x_i,\alpha)$ the situation is different. FIG. 3 shows $L_o(x_i,\alpha)$ as a function of $\alpha$. We see that the likelihood is larger than $-3.9758$ and $-1.3629$ and indeed seems to grow towards infinity as $\alpha$ goes to zero. This graph confirmed the behavior predicted in Lemma 5. After our theoretical exposition, it seems appropriate to shift gear and consider some real data. We are, in particular, interested in acoustic data of speech. Digitized speech sampled at a rate of 16 KHz is considered. A frame consists of a segment of speech of duration 25 msec. and produces thirty-nine dimensional acoustic cepstral vectors via the following process, which is standard in speech recognition literature. Frames are advanced every 10 msec. to obtain succeeding acoustic vectors.

First, magnitudes of discrete Fourier transform of samples of speech data in a frame are considered in a logarithmically warped frequency scale. Next, these amplitude values themselves are transformed to a logarithmic scale, and subsequently, a rotation in the form of discrete cosine transform is applied. The first thirteen components of the resulting vector are retained. First and the second order differences of the sequence of vectors so obtained are then appended to the original vector to obtain the thirty-nine dimensional cesptral acoustic vectors.

As in supervised learning tasks, we assume that these vectors are labeled according to the basic sounds they correspond to. In fact, the set of 46 phonemes are subdivided into a set of one hundred twenty-six different variants each corresponding to a "state" in the hidden Markov model used for recognition proposed. They are further subdivided into more elemental sounds called allophones by using the method of decision trees depending on the context in which they occur. See Frederick Jelenik, "Statistical Methods for Speech Recognition", MIT Press, 1997, L. R. Bahl, P. V. Desouza, P. S. Gopaikrishnan, M. A. Picheny, Context dependent vector quantization for continuous speech recognition, *Proceedings of IEEE Int. Conf. On Acoustics Speech and Signal Processing*, pp. 632–635, 1993, and Leo Breiman, "Classification and Regression Trees" Wadsworth International, Belmont, Calif., 1983.

We chose an allophone at random and made plots of $L_o(\mu,\alpha)$ for each dimension to determine the best value of $\alpha$. The particular allophone we chose corresponded to the phone AX as in the world "MAXIMUM" pronounced M AB K S A MUM. These plots are shown in FIGS. 4 to 42. Looking at the figures, we observe that $L_o(\mu,\alpha)$ is highly unsymmetric. Moreover, it appears that the first and second difference (dimensions 12 to 25, FIGS. 12 to 29, and dimensions 26 to 38, FIGS. 30 to 42) generally prefer lower values of $\alpha$ than the unappended cepstral vector.

Table 1 shows the optimal values of $\alpha$ for each dimension corresponding to the phonemes AX, F, N and T. These phonemes were chosen so as to represent four distinct sounds corresponding to vowel, fricative, nasal and stop. The optimal values of $\alpha$ were extracted from two dimensional surface plots of $L_o(\mu,\alpha)$ for the respective allophones and dimensions.

TABLE 1

Optimal choice of α for a vowel, a fricative, a nasal and a stop

| | Allophone | | | |
|---|---|---|---|---|
| | 513 | 1300 | 2300 | 3100 |
| | Phoneme | | | |
| dimension | AX | F | N | T |
| 0 | 2.01 | 1.60 | 1.58 | 1.39 |
| 1 | 2.78 | 1.92 | 1.77 | 1.60 |
| 2 | 1.84 | 1.92 | 1.86 | 1.77 |
| 3 | 1.80 | 1.83 | 1.78 | 1.83 |
| 4 | 1.86 | 1.90 | 2.04 | 1.76 |
| 5 | 2.02 | 1.80 | 1.87 | 1.80 |
| 6 | 2.59 | 1.84 | 1.77 | 1.86 |
| 7 | 1.90 | 1.98 | 1.89 | 1.89 |
| 8 | 1.91 | 2.05 | 1.82 | 1.73 |
| 9 | 2.64 | 1.95 | 2.13 | 1.73 |
| 10 | 1.86 | 2.00 | 1.78 | 1.92 |
| 11 | 2.26 | 1.82 | 2.02 | 1.94 |
| 12 | 2.22 | 2.23 | 1.76 | 1.70 |
| 13 | 1.40 | 1.40 | 1.04 | 1.50 |
| 14 | 1.58 | 1.76 | 1.43 | 1.46 |
| 15 | 1.52 | 1.88 | 1.22 | 1.59 |
| 16 | 1.88 | 1.85 | 1.24 | 1.56 |
| 17 | 1,48 | 1.77 | 1.29 | 1.66 |
| 18 | 1.40 | 1.87 | 1.46 | 1.78 |
| 19 | 1,58 | 1.90 | 1.44 | 1.86 |
| 20 | 1.48 | 1.89 | 1.50 | 1.87 |

TABLE 1-continued

Optimal choice of α for a vowel, a fricative, a nasal and a stop

| | Allophone | | | |
|---|---|---|---|---|
| | 513 | 1300 | 2300 | 3100 |
| | Phoneme | | | |
| dimension | AX | F | N | T |
| 21 | 1.44 | 2.02 | 1.54 | 1.76 |
| 22 | 1.54 | 1.98 | 1.55 | 1.94 |
| 23 | 1.53 | 1.92 | 1.63 | 1.86 |
| 24 | 1.61 | 1.87 | 1.51 | 1.73 |
| 25 | 1.30 | 1.34 | 096 | 2.26 |
| 26 | 1.46 | 1.43 | 0.78 | 1.48 |
| 27 | 1.66 | 2.00 | 1.45 | 1.97 |
| 28 | 1.57 | 1.87 | 1.39 | 1.93 |
| 29 | 1.33 | 1.73 | 1.54 | 2.14 |
| 30 | 1.42 | 1.82 | 1.42 | 1.94 |
| 31 | 1.46 | 1.99 | 1.66 | 1.90 |
| 32 | 1.49 | 1.91 | 1.55 | 1.90 |
| 33 | 1.54 | 1.94 | 1.67 | 1.83 |
| 34 | 1.46 | 1.93 | 1.52 | 1.82 |
| 35 | 1.52 | 1.86 | 1.63 | 1.74 |
| 36 | 1.55 | 1.90 | 1.67 | 1.85 |
| 37 | 1.57 | 1.82 | 1.58 | 1.87 |
| 38 | 1.13 | 1.62 | 1.24 | 1.84 |

Numerical Computations of $\alpha$, $\mu$ and $\sigma$

As seen from the foregoing discussion, the optimal choice for $\sigma$ is given by (21) for a fixed $\mu$ and $\alpha$. Once this choice of $\sigma$ is made the average log-likelihood is giving by (19). Therefore, we need only worry about finding $\mu$ and $\alpha$. Since we are unable to do this analytically, we aim at finding a numerically convergent iteration scheme that converges to the optimal values. For the value of $\mu$, we use the same approach as in Basu and Micchelli, supra,. Differentiating $L_\sigma(\mu,\alpha)$ with respect to $\mu$ we get $$\frac{\partial L_\sigma(\mu, \alpha)}{\partial \mu} = \frac{\sum_{i=1}^{N} |x_i - \mu|^{\alpha-2}(x_i - \mu)}{\sum_{i=1}^{N} |x_i - \mu|^\alpha}$$

Equating this to zero provides the stationary equation for $\mu$, which we can rewrite as $$u = \frac{\sum_{i=1}^{N} |x_i - \mu|^{(\alpha-2)} x_i}{\sum_{i=1}^{N} |x_i - \mu|^{(\alpha-2)}} \quad (23)$$

Considering $\mu$'s on the right hand side as old values, we compute updated values of $\mu$ from (23). Despite the analysis performed in Basu and Micchelli, supra, the iterative formula for computing $\mu$ so obtained, is seen to converge numerically.

It remains to find the optimal choice of $\alpha$. To this end, we consider a portfolio of iterative methods, each of which are tested numerically. Clearly, we know a priori that $\alpha>0$. Any iteration method considered ought to guarantee that this is so regardless of the starting value of $\alpha$. Differentiating $L_\sigma(\mu,\alpha)$ with respect to $\alpha$ we obtain the stationary equation for $\alpha$.

$$\log(\alpha) + \psi\left(\frac{1}{\alpha} + 1\right) + \log(S(\alpha)) - \frac{\alpha S^l(\alpha)}{S(\alpha)} = 0 \quad (24)$$

where $$S(\alpha) = \frac{1}{N} \sum_{i=1}^{N} |x^i - \mu|^\alpha.$$

Here, we have used the identity $$\psi\left(\frac{1}{\alpha} + 1\right) = \psi\left(\frac{1}{\alpha}\right) + \alpha.$$

One way of ensuring that $\alpha$ is positive is by isolating $\log \alpha$ on one side and exponentiating both sides to get $$\alpha = \frac{\exp\left(\frac{\alpha S^l(\alpha)}{S(\alpha)} - \psi\left(\frac{1}{\alpha} + 1\right)\right)}{S(\alpha)}. \quad (25)$$

Rewriting this gives the alternate iteration $$\alpha = \alpha^2 S(\alpha) \exp\left(-\frac{\alpha S^l(\alpha)}{s\alpha} + \psi\left(\frac{1}{\alpha} + 1\right)\right). \quad (26)$$

Using the formula $$\psi\left(\frac{1}{\alpha} + 1\right) = \psi\left(\frac{1}{\alpha}\right) + \alpha$$

we isolate $\alpha$ as follows $$\alpha = \frac{\alpha S^l(\alpha)}{S(\alpha)} - \log S(\alpha) - \log(\alpha) - \psi\left(\frac{1}{\alpha}\right)$$

The right hand side of the above equation is not necessarily positive. To make it possible we square both sides and divide by $\alpha$. This gives the iteration formula for $\alpha$ $$\alpha = \frac{1}{\alpha}\left(\frac{\alpha S^l(\alpha)}{S(\alpha)} - \log S(\alpha) - \log(\alpha) - \psi\left(\frac{1}{\alpha}\right)\right)^2. \quad (27)$$

Modifying this equation, we also get another iteration formula, namely, $$\alpha = \alpha^3\left(\frac{\alpha S^l(\alpha)}{S(\alpha)} - \log S(\alpha) - \log(\alpha) - \psi\left(\frac{1}{\alpha}\right)\right)^{-2}. \quad (28)$$

Finally, we wish to test Newton's method for locating zeros of an equation. However, Newton's method does not guarantee positivity. To circumvent this problem we introduce the temporary variable $\alpha=\beta^2$. We are solving the equation $f(\alpha)=0$, where $$f(\alpha) = \psi\left(1 + \frac{1}{\alpha}\right) + \log(\alpha) + \log S(\alpha) - \frac{\alpha S'(\alpha)}{S(\alpha)}$$

Classical Newton's iteration is $$\hat{\alpha} = \alpha - \frac{f(\alpha)}{f'(\alpha)},$$

where $\hat{\alpha}$ is the updated estimate of the root. As we introduce $\alpha=\beta^2$ we consider the function $g(\beta)=f(\beta^2)$. Newton's iteration applied to $g(\beta)$ gives us $$\beta = \beta - \frac{g(\beta)}{g'(\beta)}.$$

Converting this to a formula involving $\alpha$ we get $$\hat{\alpha} = \left(\sqrt{\alpha} - \frac{f(\alpha)}{2\sqrt{\alpha}\,f'(\alpha)}\right)^2 \quad (29)$$

where $$f'(\alpha) = -\frac{1}{\alpha^2}\psi\left(1+\frac{1}{\alpha}\right) + \frac{1}{\alpha} - \alpha\frac{S''(\alpha)S(\alpha)-(S'(\alpha))^2}{(S(\alpha))^2}$$

We must now evaluate this portfolio of five formulas on a numerical basis. We initially evaluate the methods using synthetically generated data whose distribution is known equal to a Gaussian with mean zero and variance one. On such data, the optimal choice of $\mu$, $\sigma$ and $\alpha$ should approach the values $\mu=0$, $\sigma=1$ and $\alpha=2$ as the number of data points approach infinity. Using 10,000 data points, we obtained the sequence of approximants in Table 2 from the initial value $\mu=1.0$ and $\alpha=1.0$. Note that we purposely picked the initial values away from the known optimal values.

TABLE 2

Numerical literates of equations (26) and (28)

| | equation (26) | | | equation (28) | | |
|---|---|---|---|---|---|---|
| iteration | $\mu$ | $\alpha$ | $L_\sigma(\mu, \alpha)$ | $\mu$ | $\alpha$ | $L_\sigma(\mu, \alpha)$ |
| 0 | 1.0000 | 1.0000 | −1.845198 | 1.0000 | 1.0000 | −1.845198 |
| 1 | 0.8590 | 1.1920 | −1.737647 | 0.8590 | 1.4715 | −1.714279 |
| 2 | 0.6230 | 1.3924 | −1.598179 | 0.3935 | 1.7826 | −1.490178 |
| 3 | 0.3607 | 1.5564 | −1.483843 | 0.0823 | 1.8616 | −1.419558 |

TABLE 2-continued

Numerical literates of equations (26) and (28)

| | equation (26) | | | equation (28) | | |
|---|---|---|---|---|---|---|
| iteration | $\mu$ | $\alpha$ | $L_\sigma(\mu, \alpha)$ | $\mu$ | $\alpha$ | $L_\sigma(\mu, \alpha)$ |
| 4 | 0.1594 | 1.6779 | −1.431333 | 0.0095 | 1.9117 | −1.415738 |
| 5 | 0.0511 | 1.7750 | −1.418282 | −0.0015 | 1.9457 | −1.415540 |
| 6 | 0.0105 | 1.8504 | −1.416146 | −0.0027 | 1.9666 | −1.415494 |
| 7 | −0.0001 | 1.9043 | −1.415705 | −0.0030 | 1.9789 | −1.415479 |
| 8 | −0.0022 | 1.9400 | −1.415556 | −0.0031 | 1.9862 | −1.415473 |
| 9 | −0.0027 | 1.9625 | −1.415501 | −0.0031 | 1.9904 | −1.415471 |
| 10 | −0.0029 | 1.9762 | −1.415481 | −0.0032 | 1.9929 | −1.415471 |
| 11 | −0.0031 | 1.9854 | −1.415474 | −0.0032 | 1.9944 | −1.415471 |
| 12 | −0.0031 | 1.9894 | −1.415472 | −0.0032 | 1.9952 | −1.415471 |
| 13 | −0.0032 | 1.9923 | −1.415471 | −0.0032 | 1.9957 | −1.415471 |
| 14 | −0.0032 | 1.9940 | −1.415471 | −0.0032 | 1.9960 | −1.415471 |
| 15 | −0.0032 | 1.9950 | −1.415471 | −0.0032 | 1.9962 | −1.415471 |
| 16 | −0.0032 | 1.9956 | −1.415471 | −0.0032 | 1.9963 | −1.415471 |
| 17 | −0.0032 | 1.9959 | −1.415471 | −0.0032 | 1.9963 | −1.415471 |
| 18 | −0.0032 | 1.9961 | −1.415471 | −0.0032 | 1.9964 | −1.415471 |
| 19 | −0.0032 | 1.9962 | −1.415471 | −0.0032 | 1.9964 | −1.415471 |

The asymptotic value of the maximum log-likelihood is $E(\log G(X))$ where $G(\cdot)$ is a Gaussian with variance one and mean equal to zero and X is a normal random variable with distribution $G(\cdot)$. Computing this value yields the quantity $$\frac{1}{2}\log\frac{2\pi}{e}$$

equals −1.41893. $L_\sigma(\mu,\alpha)$ may of course, be larger than this value for a particular set of data and the deviation will indicate overtraining.

Only two of the five methods converge from the starting point $\mu=1$, $\sigma=1$. The first twenty approximants are shown in Table 2.

Disapointingly enough Newton's method did not converge from an arbitrary starting point. However, it converge locally. We initialized $\mu$ to be $$\mu = \frac{1}{N}\sum_{i=1}^{N} x_i \text{ and } \mu = 1.$$

With this choice, Newton's method converged rapidly. See Table 3.

TABLE 3

Numerical iterates of equations (26), (28) and (29) for a near optimal starting point (synthetic data).

| | equation (26) | | | equation (28) | | | equation (29) | | |
|---|---|---|---|---|---|---|---|---|---|
| Iteration | $\mu$ | $\alpha$ | $L_\sigma(\mu, \alpha)$ | $\mu$ | $\alpha$ | $L_\sigma(\mu, \alpha)$ | $\mu$ | $\alpha$ | $L_\sigma(\mu, \alpha)$ |
| 0 | −0.003 | 1.00 | −1.46 | −0.003 | 1.00 | −1.46 | −0.003 | 1.00 | −1.46 |
| 1 | −0.001 | 1.14 | −1.44 | −0.001 | 1.35 | −1.43 | −0.001 | 5.30 | −1.51 |
| 2 | −0.000 | 1.30 | −1.43 | 0.000 | 1.59 | −1.42 | −0.084 | 2.97 | −1.43 |
| 3 | 0.001 | 1.46 | −1.42 | 0.000 | 1.75 | −1.41 | −0.064 | 2.19 | −1.41 |
| 4 | 0.002 | 1.60 | −1.42 | −0.000 | 1.85 | −1.41 | −0.018 | 2.00 | −1.41 |
| 5 | 0.001 | 1.72 | −1.41 | −0.001 | 1.91 | −1.41 | −0.003 | 1.99 | −1.41 |
| 6 | −0.000 | 1.81 | −1.41 | −0.002 | 1.94 | −1.41 | −0.003 | 1.99 | −1.41 |
| 7 | −0.001 | 1.88 | −1.41 | −0.002 | 1.96 | −1.41 | −0.003 | 1.99 | −1.41 |
| 8 | −0.002 | 1.92 | −1.41 | −0.003 | 1.97 | −1.41 | −0.003 | 1.99 | −1.41 |
| 9 | −0.002 | 1.95 | −1.41 | −0.003 | 1.98 | −1.41 | −0.003 | 1.99 | −1.41 |
| 10 | −0.002 | 1.97 | −1.41 | −0.003 | 1.99 | −1.41 | −0.003 | 1.99 | −1.41 |
| 11 | −0.003 | 1.98 | −1.41 | −0.003 | 1.99 | −1.41 | −0.003 | 1.99 | −1.41 |
| 12 | −0.003 | 1.98 | −1.41 | −0.003 | 1.99 | −1.41 | −0.003 | 1.99 | −1.41 |

TABLE 3-continued

Numerical iterates of equations (26), (28) and (29) for a near optimal starting point (synthetic data).

| | equation (26) | | | equation (28) | | | equation (29) | | |
|---|---|---|---|---|---|---|---|---|---|
| Iteration | $\mu$ | $\alpha$ | $L_\sigma(\mu, \alpha)$ | $\mu$ | $\alpha$ | $L_\sigma(\mu, \alpha)$ | $\mu$ | $\alpha$ | $L_\sigma(\mu, \alpha)$ |
| 13 | −0.003 | 1.99 | −1.41 | −0.003 | 1.99 | −1.41 | −0.003 | 1.99 | −1.41 |
| 14 | −0.003 | 1.99 | −1.41 | −0.003 | 1.99 | −1.41 | −0.003 | 1.99 | −1.41 |

The remaining two methods appear not to converge regardless of proximity of starting value to the optimum. We demonstrate this by choosing the start value $\alpha=2$ and $$\mu = \frac{1}{N}\sum_{i=1}^{N} x_i.$$

Observe that both methods diverge from the optimal value, see Table 4.

TABLE 4

Numerical literates of equations (25) and (27)

| itera- | equation (25) | | | equation (27) | | |
|---|---|---|---|---|---|---|
| tion | $\mu$ | $\alpha$ | $L_\sigma(\mu,\alpha)$ | $\mu$ | $\alpha$ | $L_\sigma(\mu,\alpha)$ |
| 0 | −0.0032 | 2.0000 | −1.415471 | −0.0032 | 2.0000 | −1.415471 |
| 1 | −0.0032 | 2.0015 | −1.415471 | −0.0032 | 2.0015 | −1.415471 |
| 2 | −0.0033 | 2.0036 | −1.415472 | −0.0033 | 2.0036 | −1.415472 |
| 3 | −0.0033 | 2.0066 | −1.415473 | −0.0033 | 2.0066 | −1.415473 |
| 4 | −0.0033 | 2.0109 | −1.415476 | −0.0033 | 2.0108 | −1.415476 |
| 5 | −0.0033 | 2.0169 | −1.415481 | −0.0033 | 2.0169 | −1.415481 |
| 6 | −0.0034 | 2.0256 | −1.415492 | −0.0034 | 2.0254 | −1.415492 |
| 7 | −0.0034 | 2.0380 | −1.415515 | −0.0034 | 2.0376 | −1.415514 |
| 8 | −0.0035 | 2.0559 | −1.415560 | −0.0035 | 2.0549 | −1.415557 |
| 9 | −0.0037 | 2.0819 | −1.415653 | −0.0037 | 2.0796 | −1.415644 |
| 10 | −0.0039 | 2.1200 | −1.415845 | −0.0039 | 2.1151 | −1.415817 |
| 11 | −0.0042 | 2.1769 | −1.416249 | −0.0041 | 2.1662 | −1.416163 |
| 12 | −0.0046 | 2.2639 | −1.417116 | −0.0045 | 2.2404 | −1.416854 |

TABLE 4-continued

Numerical literates of equations (25) and (27)

| itera- | equation (25) | | | equation (27) | | |
|---|---|---|---|---|---|---|
| tion | $\mu$ | $\alpha$ | $L_\sigma(\mu,\alpha)$ | $\mu$ | $\alpha$ | $L_\sigma(\mu,\alpha)$ |
| 13 | −0.0052 | 2.4023 | −1.419039 | −0.0050 | 2.3493 | −1.418230 |
| 14 | −0.0062 | 2.6359 | −1.423528 | −0.0058 | 2.5116 | −1.420964 |
| 15 | −0.0078 | 3.0724 | −1.434908 | −0.0069 | 2.7583 | −1.426381 |
| 16 | −0.0108 | 4.0568 | −1.468221 | −0.0084 | 3.1443 | −1.437055 |
| 17 | −0.0204 | 7.4348 | −1.596076 | −0.0109 | 3.7725 | −1.457929 |
| 18 | −0.1085 | 54.4963 | −2.057873 | −0.0154 | 4.8505 | −1.498251 |
| 19 | 4.0544 | 15407.7 | −INF | −0.0265 | 6.8322 | −1.573973 |

It is well and good that our methods converge for synthetic data. However, in the real world things are not as nice. We therefore, test our remaining working methods on real data. We used the same data we previously used to maximize the log likelihood as a function of $\mu$ and $\sigma$ vis graphical methods. Firstly, we run the three methods on leaf 513 dimension 0 using the starting point $\alpha=2$ and $$\mu = \frac{1}{N}\sum_{i=1}^{N} x_i.$$

See Table 5.

TABLE 5

Numerical iterates of equations (26), (28) and (29) for a near optimal starting point (real data)

| | equation (26) | | | equation (28) | | | equation (29) | | |
|---|---|---|---|---|---|---|---|---|---|
| Iteration | $\mu$ | $\alpha$ | $L_\sigma(\mu, \alpha)$ | $\mu$ | $\alpha$ | $L_\sigma(\mu, \alpha)$ | $\mu$ | $\alpha$ | $L_\sigma(\mu, \alpha)$ |
| 0 | 80.5 | 2.0 | −4.65 | 80.5 | 2.00 | −4.65 | 80.5 | 2.00 | −4.65 |
| 1 | 80.5 | 1.9 | −4.65 | 80.5 | 2.01 | −4.65 | 80.5 | 2.00 | −4.65 |
| 2 | 80.5 | 1.9 | −4.65 | 80.5 | 2.01 | −4.65 | 80.5 | 2.00 | −4.65 |
| 3 | 80.6 | 1.9 | −4.65 | 80.5 | 2.01 | −4.65 | 80.5 | 2.01 | −4.65 |
| 4 | 80.6 | 1.9 | −4.65 | 80.5 | 2.01 | −4.65 | 80.5 | 2.01 | −4.65 |
| 5 | 80.6 | 1.9 | −4.65 | 80.5 | 2.01 | −4.65 | 80.5 | 2.01 | −4.65 |
| 6 | 80.6 | 1.9 | −4.65 | 80.5 | 2.01 | −4.65 | 80.5 | 2.01 | −4.65 |
| 7 | 80.6 | 1.8 | −4.65 | 80.5 | 2.01 | −4.65 | 80.5 | 2.01 | −4.65 |
| 8 | 80.6 | 1.8 | −4.65 | 80.5 | 2.01 | −4.65 | 80.5 | 2.01 | −4.65 |
| 9 | 80.6 | 1.7 | −4.65 | 80.5 | 2.01 | −4.65 | 80.5 | 2.01 | −4.65 |
| 10 | 80.7 | 1.6 | −4.65 | 80.5 | 2.01 | −4.65 | 80.5 | 2.01 | −4.65 |
| 11 | 80.7 | 1.5 | −4.65 | 80.5 | 2.01 | −4.65 | 80.5 | 2.01 | −4.65 |
| 12 | 80.8 | 1.4 | −4.66 | 80.5 | 2.01 | −4.65 | 80.5 | 2.01 | −4.65 |
| 13 | 80.8 | 1.2 | −4.67 | 80.5 | 2.01 | −4.65 | 80.5 | 2.01 | −4.65 |
| 14 | 80.9 | 1.1 | −4.68 | 80.5 | 2.01 | −4.65 | 80.5 | 2.01 | −4.65 |
| 15 | 80.9 | 0.9 | −4.70 | 80.5 | 2.01 | −4.65 | 80.5 | 2.01 | −4.65 |
| 16 | 81 | 0.8 | −4.73 | 80.5 | 2.01 | −4.65 | 80.5 | 2.01 | −4.65 |
| 17 | 81 | 0.7 | −4.75 | 80.5 | 2.01 | −4.65 | 80.5 | 2.01 | −4.65 |
| 18 | 81 | 0.6 | −4.79 | 80.5 | 2.01 | −4.65 | 80.5 | 2.01 | −4.65 |
| 19 | 81 | 0.5 | −4.82 | 80.5 | 2.01 | −4.65 | 80.5 | 2.01 | −4.65 |

To further test the remaining working methods, we ran the experiments for all dimension of leaf 513, computed the optimal value of α and compared them with the previous results of the graphical method. All methods seem to converge to nearby values. See Table 6.

TABLE 6

Optimal choice of α for AX via graphical method, Newton's method (29) and equation (28) using 20 iterations

| dim | Graph | Newton | eq. (28) |
|---|---|---|---|
| 0 | 2.01 | 2.012 | 2.012 |
| 1 | 2.78 | 2.787 | 2.790 |
| 2 | 1.84 | 1.838 | 1.838 |
| 3 | 1.80 | 1.803 | 1.803 |
| 4 | 1.86 | 1.867 | 1.867 |
| 5 | 2.02 | 2.022 | 2.022 |
| 6 | 2.59 | 2.530 | 2.596 |
| 7 | 1.90 | 1.909 | 1.909 |
| 8 | 1.91 | 1.913 | 1.913 |
| 9 | 2.64 | 2.633 | 2.643 |
| 10 | 1.86 | 1.866 | 1.866 |
| 11 | 2.26 | 2.265 | 2.265 |
| 12 | 2.22 | 2.223 | 2.223 |
| 13 | 1.40 | 1.402 | 1.403 |
| 14 | 1.58 | 1.591 | 1.591 |
| 15 | 1.52 | 1.521 | 1.521 |
| 16 | 1.88 | 1.890 | 1.889 |
| 17 | 1,48 | 1.480 | 1.480 |
| 18 | 1.40 | 1.402 | 1.402 |
| 19 | 1,58 | 1.577 | 1.577 |
| 20 | 1.48 | 1.488 | 1.488 |
| 21 | 1.44 | 1.445 | 1.445 |
| 22 | 1.54 | 1.543 | 1.543 |
| 23 | 1.53 | 1.535 | 1.535 |
| 24 | 1.61 | 1.614 | 1.614 |
| 25 | 1.30 | 1.305 | 1.309 |
| 26 | 1.46 | 1.474 | 1.474 |
| 27 | 1.66 | 1.663 | 1.663 |
| 28 | 1.57 | 1.565 | 1.565 |
| 29 | 1.33 | 1.328 | 1.328 |
| 30 | 1.42 | 1.422 | 1.422 |
| 31 | 1.46 | 1.466 | 1.466 |
| 32 | 1.49 | 1.488 | 1.488 |
| 33 | 1.54 | 1.547 | 1.547 |
| 34 | 1.46 | 1.460 | 1.460 |
| 35 | 1.52 | 1.526 | 1.526 |
| 36 | 1.55 | 1.557 | 1.557 |
| 37 | 1.57 | 1.572 | 1.572 |
| 38 | 1.13 | 1.153 | 1.157 |

Applications to Speech Recognition

We have now considered at length one dimensional α-densities. For, in particular, applications to speech recognition, the data is multidimensional and of a nature so complex as not to be accurately described in a single α-density. In Basu and Micchelli, supra, various mixtures of multidimensional α-densities were introduced and successfully applied to speech recognition. However, the value of α was fixed a priori and left constant over the mixture components. We will discuss how the individual mixture components can have differing values of α and how one goes about finding the optimal choices of α.

Let us describe how mixtures of multidimensional α-densities are constructed. The individual components are given by $$P(x \mid \lambda^l) = \frac{P_d(\alpha^l)}{\sqrt{\prod_{i=1}^{d} \sigma_i^l}} \exp\left\{-\left(\gamma_d(\alpha^l) \sum_{i=1}^{d} \frac{(x_i - \mu_i^l)^2}{\sigma_i^l}\right)^{\alpha^l/2}\right\}, \quad (30)$$

where $$\rho_d(\alpha) = \frac{\alpha}{2} \frac{\Gamma\left(\frac{d}{2}\right)\Gamma\left(\frac{d+2}{\alpha}\right)^{\frac{d}{2}}}{(d\pi)^{\frac{d}{2}}\Gamma\left(\frac{d}{\alpha}\right)^{\frac{d}{2}+1}} \quad \text{and} \quad \gamma_d(\alpha) = \frac{\Gamma\left(\frac{d+2}{\alpha}\right)}{d\,\Gamma\left(\frac{d}{\alpha}\right)}$$

and $\lambda^l$ denotes the collection of parameters $\alpha^l$, $\mu^l$ and $\sigma^l$, where $l=1, \ldots, m$. The mixture density is now given by $$P(x \mid \Lambda, w) = \sum_{l=1}^{m} w^l p(x \mid \lambda^l).$$

The log-likelihood of a data set $\{x^k\}_{k=1}^{N}$ is, thus, given as $$\log L = \sum_{k=1}^{N} \log\left(\sum_{l=1}^{m} w^l p(x \mid \lambda^l)\right).$$

We are ultimately interested in maximizing log L. A desirable property of an iteration scheme would, therefore, be to increase the value of log L. We denote old parameters by "hatted" quantities and mimic the EM philosophy as expounded in Christopher M. Bishop, "*Neural Networks for Pattern Recognition*", Cambridge University Press, 1997. We have $$\log L - \log \hat{L} = \sum_{k=1}^{N} \left\{\frac{\sum_{l=1}^{m} w^l p(x^k \mid \lambda^l)}{\sum_{j=1}^{m} \hat{w}^j p(x^k \mid \hat{\lambda}^j)} \times \frac{\hat{w}^l p(x^k \mid \hat{\lambda}^l)}{\hat{w}^l p(x^k \mid \hat{\lambda}^l)}\right\} \geq \quad (31)$$

$$\sum_{k=1}^{N} \sum_{l=1}^{m} \frac{\hat{w}^l p(x^k \mid \hat{\lambda}^l)}{\sum_{l=1}^{m} \hat{w}^j p(x^k \mid \hat{\lambda}^j)} \log\left(\frac{w^l p(x^k \mid \lambda^l)}{\hat{w}^l p(x^k \mid \hat{\lambda}^l)}\right)$$

where the well known Jensen's inequality (see Christopher M. Bishop, supra) $\log\Sigma(b_i a_i) \geq \Sigma b_i \log a_i$, where $\Sigma b_i = 1$ with $b_i \geq 0$ and $a_i \geq 0$, arising from the concavity of the logarithmic function has been used in the last step with $$b_l = \hat{w}^l p(x^k \mid \hat{\lambda}^l) \left(\sum_{j=1}^{m} \hat{w}^j p(x^k \mid \hat{\lambda}^j)\right)^{-1} \quad \text{for } l = 1, \ldots, m.$$

We regroup equation (31) into three types of terms.

$$\log L - \log \hat{L} A + B + C$$

where $$A(w, \hat{w}, \hat{\Lambda}) = \sum_{l=1}^{m} A_l \log(w^l)$$

$$B(\Lambda, \hat{w}, \hat{\Lambda}) = \sum_{k=1}^{N} \sum_{l=1}^{m} A_{lk} \log p(x^k \mid \lambda^l)$$

$$C(\hat{w}, \hat{\Lambda}) = \sum_{k=1}^{N} \sum_{l=1}^{m} A_{lk} \log(\hat{w}^l p(x^k \mid \lambda^l)) \text{ and}$$

$$A_l k = \frac{\hat{w}^l p(x^k \mid \lambda^l)}{\sum_{j=1}^{m} \hat{w}^j p(x^k \mid \lambda^j)} \text{ and } A_l = \sum_{k=1}^{N} A_l k.$$

Note that the term C only depends on old parameters and A depends only on $w^l$, $l=1, \ldots, m$ and old parameters, whereas B depends on $\Lambda$ and old parameters. Clearly, log L−log $\hat{L}$=0 when the old parameters and the new parameters are equal. Maximizing log L−log $\hat{L}$ for a particular parameter while the others are fixed guarantees that the log-likelihood does not decrease. This can be done explicitly for $w^l$, $l=1, \ldots, m$ subject to the constraint $$\sum_{l=1}^{m} w^l = 1.$$

Using Lagrange multipliers we arrive at the following equation.

$$\frac{A_l}{w_l} - \Theta = 0, l=1, \ldots, m$$

Where $\Theta$ is the Lagrange multiplier. Solving for $\Theta$ we get $$\Theta = \sum_{l=1}^{m} A_l = N,$$

which yields $w^l=1/NA_l$. This was done in Basu and Micchelli, supra. Similarly, one may try to maximize with respect to $\mu^l$ and $\sigma^l$, but this cannot be done explicitly. The stationary equation is available in Basu and Micchelli, supra, and the update formulas $$\mu_i^l = \frac{\sum_{k=1}^{N} \left( \sum_{j=1}^{d} \frac{(x_j^k - \hat{\mu}_j^l)^2}{\hat{\sigma}_j^l} \right)^{\hat{\alpha}^l/2 - 1} A_{lk} x_i^k}{\sum_{k=1}^{N} \left( \sum_{j=1}^{d} \frac{(x_j^k - \hat{\mu}_j^l)^2}{\hat{\sigma}_j^l} \right)^{\hat{\alpha}^l/2 - 1} A_{lk}} \text{ and} \quad (32)$$

$$\sigma_i^l = \frac{\hat{\alpha}^l \gamma_d(\hat{\alpha}^l)^{\hat{\alpha}^l/2} \sum_{k=1}^{N} \left( \sum_{j=1}^{d} \frac{(x_j^k - \hat{\mu}_j^l)^2}{\hat{\sigma}_j^l} \right)^{\hat{\alpha}^l/2 - 1} A_{lk}(x_i^k - \hat{\mu}_i^l)^2}{A_l} \quad (33)$$

for $i=1, \ldots, d$ and $l=1, \ldots, m$ are suggested. It remains to construct update formulas for $\alpha^l$, $l=1, \ldots, m$. We have $$\log p(x \mid \lambda^l) = \frac{1}{2} \left( \sum_{i=1}^{d} \log \sigma_i^l \right) + \log \rho_d(\alpha^l) - \left( \gamma_d(\alpha^l) \sum_{i=1}^{d} \frac{(x_i - \mu_i^l)^2}{\hat{\sigma}_i^l} \right)^{\alpha^l/2}$$

which makes it possible to separate the $\alpha^l$ variables.

$$B(\Lambda, \hat{w}, \hat{\Lambda}) = \sum_{l=1}^{m} B^l(\Lambda, \hat{w}, \hat{\Lambda})$$

where $$B^l(\Lambda, \hat{w}, \hat{\Lambda}) =$$

$$\sum_{k=1}^{N} A_{lk} \left( \frac{1}{2} \left( \sum_{i=1}^{d} \log \sigma_i^l \right) + \log \rho_d(\alpha^l) - (\gamma_d(\alpha^l))^{\alpha^l/2} \left( \sum_{i=1}^{d} \frac{(x_i^k - \mu_i^l)^2}{\sigma_i^l} \right)^{\alpha^l/2} \right).$$

To maximize log L−log $\hat{L}$ with respect to $\alpha^l$, it therefore, suffice to maximize $B^l(\Lambda, \hat{w}, \hat{\Lambda})$ with respect to $\alpha^l$. This can be done numerically as was done in the previous section. However, we decide to maximize $B^l(\Lambda, \hat{w}, \hat{\Lambda})$ by route force. Note that this can be done without incurring much computational cost. Assuming that we wish to compute $B^l(\Lambda, \hat{w}, \hat{\Lambda})$ for $\alpha_l = \alpha_{min}, \alpha_{min} + \Delta_\alpha, \ldots, \alpha_{min} + N_\alpha \Delta_\alpha = \alpha_{max}$ we note that the greatest computational cost is in computing $$S_{kl} = \sum_{i=1}^{d} \frac{(x_i^k - \mu_i^l)^2}{\sigma_i^l}$$

for $k=1, 2, \ldots, m$.

Once $(S_{kl})^{\Delta \alpha}$ and $(S_{kl})^{\alpha_{min}}$ have been computed, the quantities $(S_{kl})^{\alpha_{min} + j \Delta_\alpha}$ can be easily computed from the corresponding value for $j-1$ by one single multiplication. In any case, as we are maximizing log L−log $\hat{L}$ over a discrete set of $\alpha$'s, that contain the previous value of $\alpha$, we are guaranteed that the log-likelihood is nondecreasing.

Numerical Experiments

Figure 43:
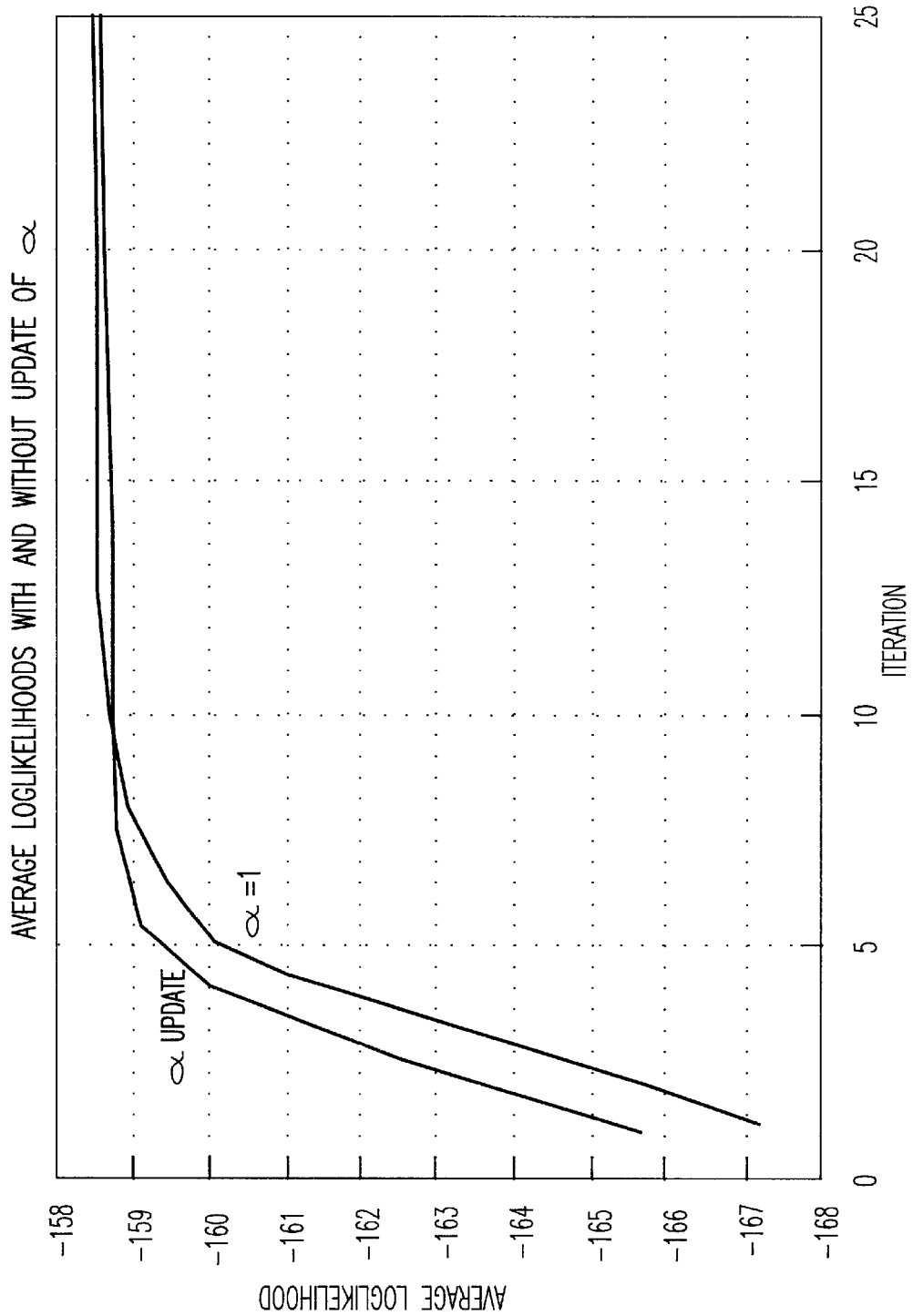
FIG. 43 is a graph showing a comparison of $\alpha$ update versus nonupdate for $\alpha=1$.
Figure 44:
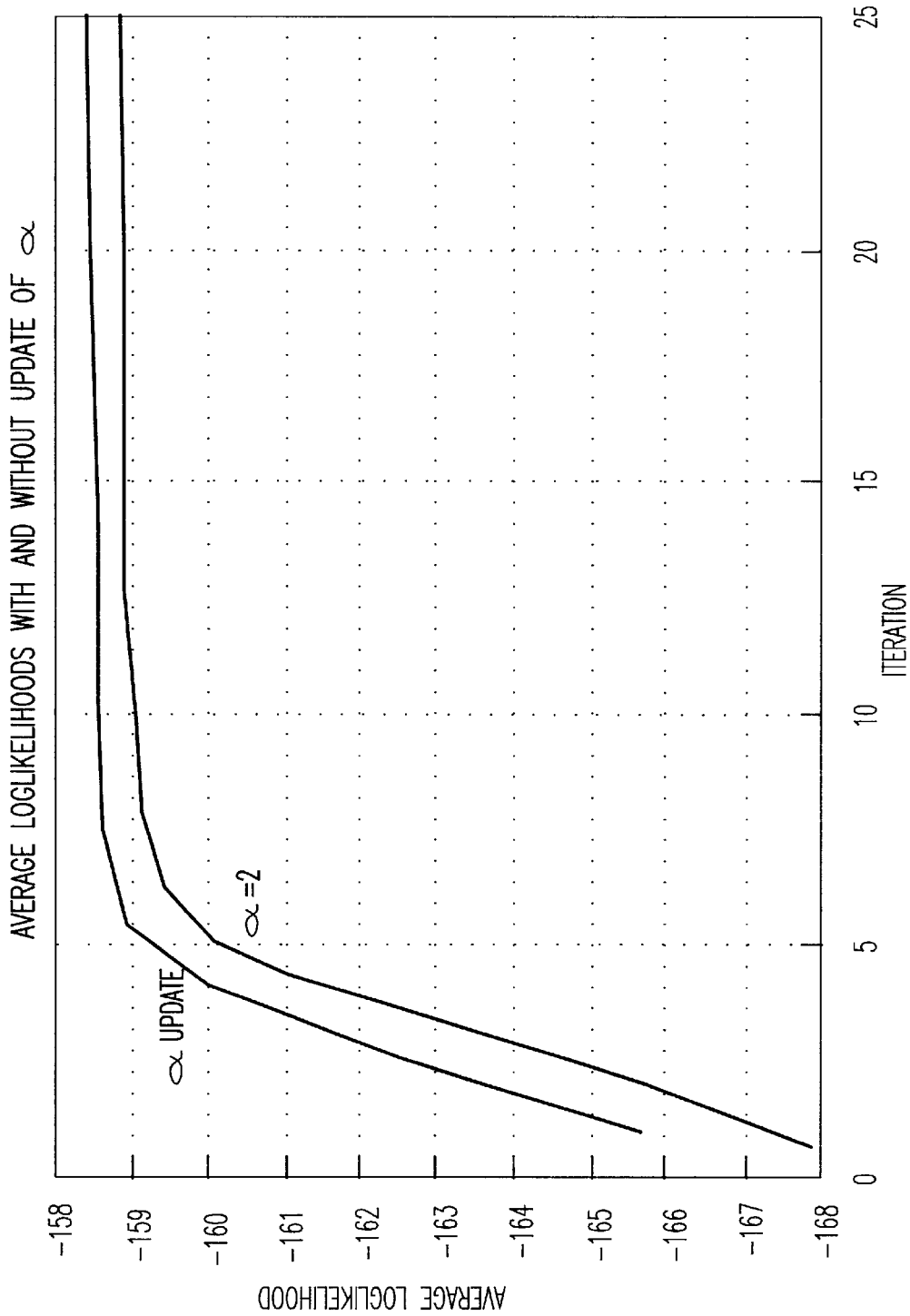
FIG. 44 is graph showing a comparison of $\alpha$ update versus nonupdate for $\alpha=2$.
Figure 45:
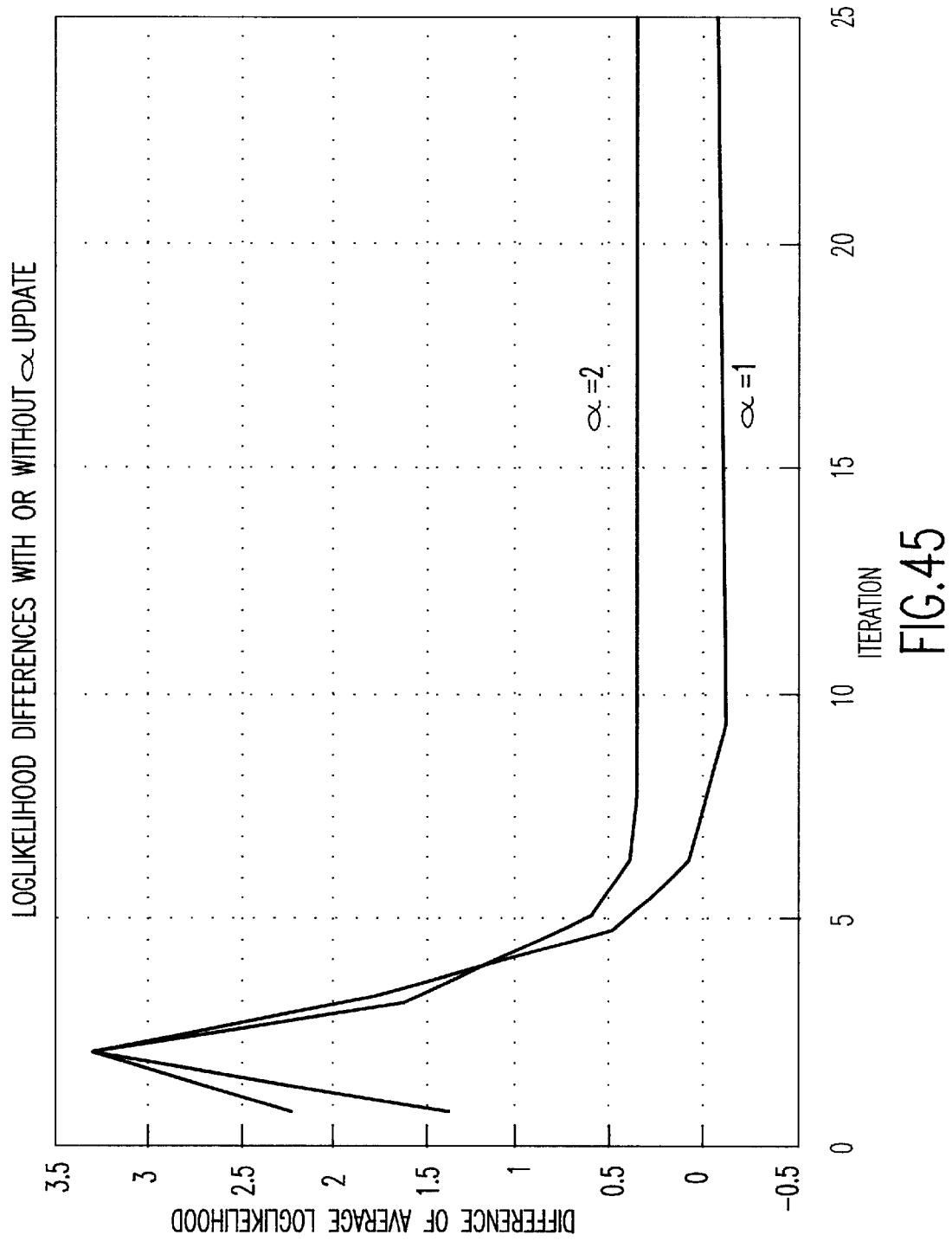
FIG. 45 is a graph of log-likelihood gains of $\alpha$ update formula as a function of iteration.

Two measurable quantities to evaluate the above technique for optimizing $\alpha$ are average log-likelihood and performance of the speech recognizer. We deal with the former first. The data used is again from leaf 513. We computed the log-likelihood after each iteration with and without using the update formula for $\alpha$. This we did for two different starting values of $\alpha$. We found that the likelihood gain was considerable for $\alpha=2$, but not for $\alpha=1$, which indeed is that the update formula for $\alpha$ gives consistent improvement in log-likelihood and is more robust than the other method. See FIGS. 43, 44 and 45.

As the ultimate objective in speech recognition is to differentiate different sounds, we decide to evaluate the discriminatory power of our density estimates. To this end, we evaluated the densities for all allophones (there are approximately 3500 of them) and compared the density of the "correct" allophone with all of the other. If the correct allophone yielded higher likelihood value than all the other allophone, we indeed achieved our goal. We produced frequencies for the correct leaf to be among the top 1, 10, 100 and 1000 highest densities. These numbers are displayed in Table 7. As can be seen, the discriminatory power of the scheme with updated $\alpha$'s is significant better than without updating $\alpha$.

For a typical speech recognition system using 46 phonemes and approximately 3,000 basic sound (leaves from a decision tree), approximately 121,000 α-Gaussians were used. Note that preferred values of α tends to be less than 1.0, re-confirmimg on a systematic basis that non-Gaussian mixture components are prefferred.

Table 7: Leaf discrimination for initial value α=1 fpr no update of α versus update of α. Columns with headings "1", "10", "100" and "1000" contain the number of vectors for which the correct leaf was among the 1, 10, 100 and 1000 first leaves. Exactly 100 vectors were sampled for each leaf.

| Leaf | 1 | 10 | 100 | 1000 | Ave. |
|---|---|---|---|---|---|
| Without update of α | | | | | |
| 0 | 25 | 78 | 96 | 100 | 20.5 |
| 1 | 24 | 70 | 96 | 100 | 23.3 |
| 2 | 56 | 88 | 98 | 99 | 23.2 |
| 3 | 28 | 83 | 97 | 100 | 13.3 |
| 4 | 29 | 80 | 96 | 100 | 16.2 |
| 5 | 33 | 79 | 97 | 99 | 29.1 |
| 6 | 20 | 66 | 95 | 100 | 23.8 |
| 7 | 15 | 52 | 88 | 100 | 57.1 |
| 8 | 46 | 78 | 95 | 100 | 32.4 |
| 9 | 38 | 76 | 95 | 100 | 21.4 |
| With update of α | | | | | |
| 0 | 32 | 74 | 98 | 100 | 16.2 |
| 1 | 24 | 73 | 97 | 100 | 13.3 |
| 2 | 64 | 92 | 98 | 99 | 22.6 |
| 3 | 36 | 88 | 98 | 100 | 804 |
| 4 | 25 | 80 | 97 | 100 | 12.9 |
| 5 | 33 | 75 | 98 | 99 | 33.2 |
| 6 | 30 | 71 | 96 | 100 | 18.6 |
| 7 | 21 | 57 | 90 | 99 | 48.0 |
| 8 | 43 | 82 | 94 | 100 | 26.3 |
| 9 | 43 | 78 | 95 | 100 | 15.4 |

The invention may be implemented in various forms of hardware, software, firmware or a combination thereof. In particular, the system modules described herein for extracting and estimating densities of acoustic feature vectors is preferably implemented in software, in an application program which is loaded into and executed by a general purpose computer, such as an IBM RS6000 work station based on the PowerPC processor running an operating system (OS) such as the IBM AIX OS (IBM's version of the UNIX OS), or a personal computer (PC) based on an Intel Pentium or PowerPC processor running a suitable windowing operating system. Such computer platforms include one or more central processing units (CPUs), a random access memory (RAM) and input/output (I/O) interfaces. The various processes and functions described herein may be part of the micro-instruction code or application programs which are executed via the operating system. In addition, various other peripheral devices may be connected to the computer platform such as additional storage devices and a printing device. The methods described here may also be implemented in portable computing devices, such as personal digital assistants (PDAs), over telephone channels and in clients/server platforms.

Figure 46:
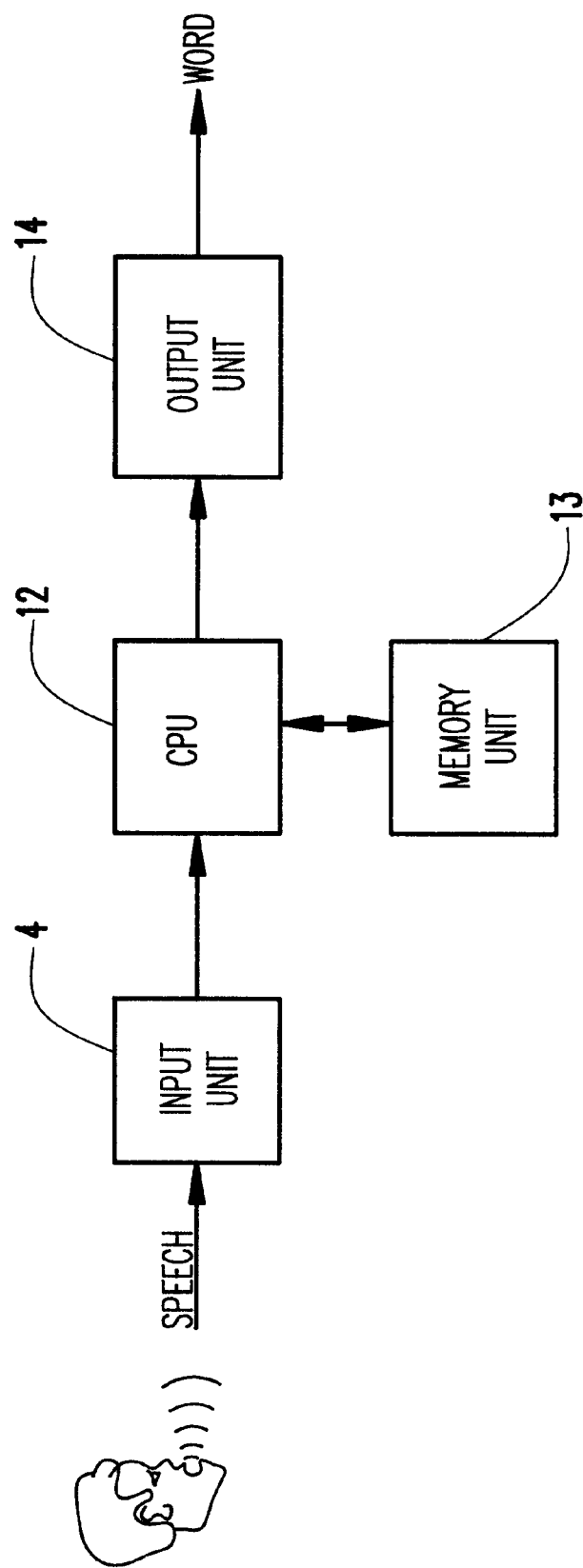
FIG. 46 is block diagram of a computer system of the type on which the subject invention may be implemented.

In general, the hardware platform is represented in FIG. 46. An input unit 11 receives physical speech from a user, then converts it to a digital signal and sends it to CPU 12. The input unit 11 may be a microphone connected to an audio adapter board plugged into a feature bus of the computer system. The audio adapter board typically includes an analog-to-digital converter (ADC) for sampling and converting acoustic signals generated by the microphone to digital signals which are input to the CPU 12. The CPU 12 is controlled by software, which is stored in memory unit 13 (typically a combination of primary memory (e.g., RAM) and secondary memory (e.g., a hard disk storage device)), and calculates $\mu^l$, $\sigma^l$ and $B_l(\alpha_0+i\Delta)$ by using the initial $\mu$, $\sigma$ and w as the initial value. Furthermore, CPU 12 stores the value of function B(α) in memory unit 13 in order to compute the value of $\hat{\alpha}^l$. In this case, $\sigma^l$ can be updated by the above Lemma 3. Therefore, CPU 12 can use the second values of $\mu$, $\sigma$ and $\alpha$ to compute the second value of function B(α) and stores it in memory unit 13. After the computation, the optimal α may be obtained when function B(α) converges or the maximum iteration is reached. After acquiring the final values of $\mu$, $\sigma$ and $\alpha$, CPU 12 can use the final $\mu$, $\sigma$ and $\alpha$ to match an already saved index table in the memory unit 13 in order to find the correct word corresponding to the inputted speech. The found word can be printed out by output unit 14, such as a printer or a monitor.

Figure 47A:
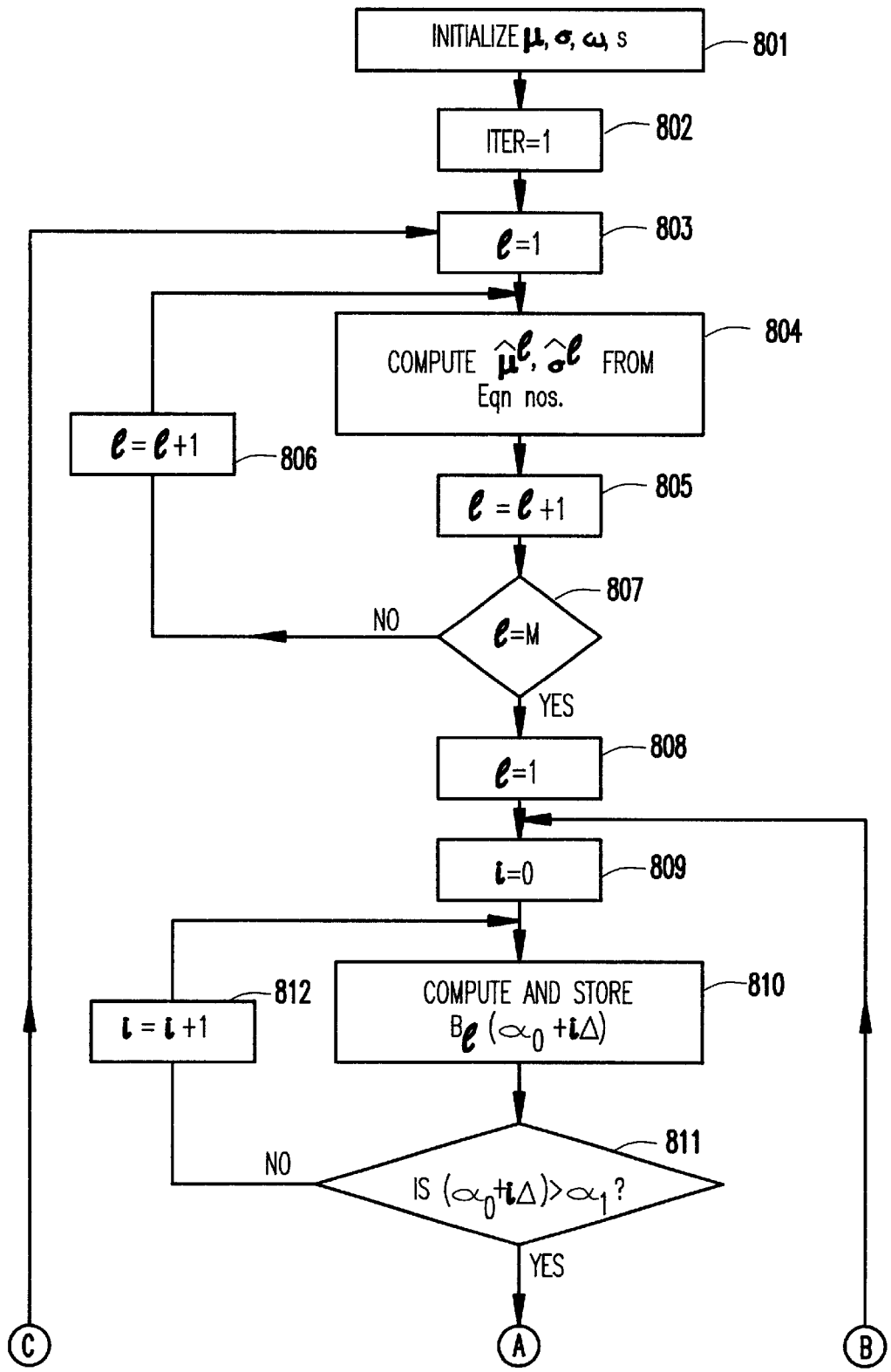
FIGS. 47A and 47B, taken together, are a flow diagram illustrating the logic of the computer implemented process according to the invention.
Figure 47B:
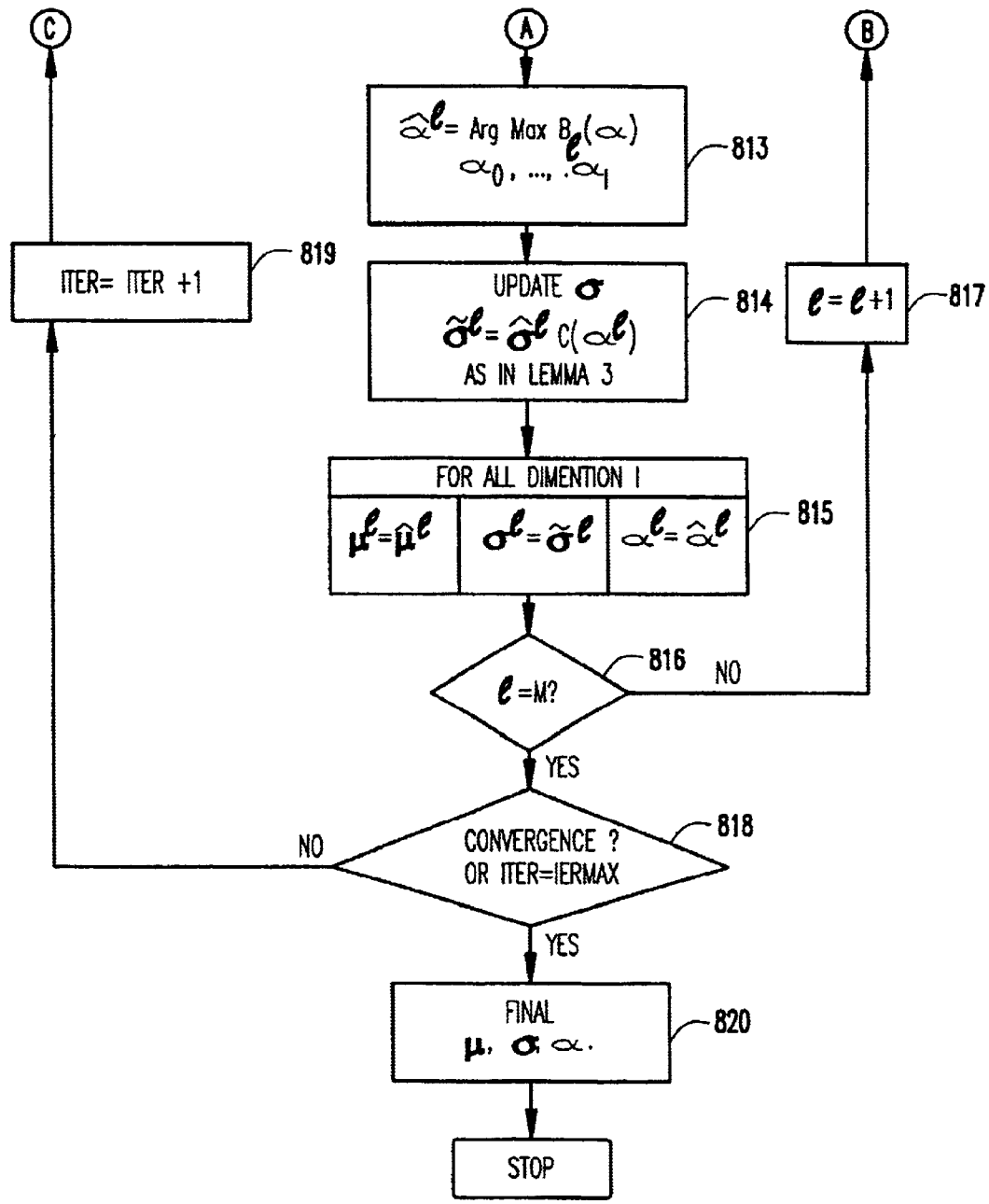

The process is illustrated in the flow diagram of FIGS. 47A and 47B. The process begins in function block 801 where $\mu$, $\sigma$ and w are initialized. The iteration number is set to 1 in function block 802, and l is set to 1 in function block 803. The process then enters a computation loop which begins by computing $\mu^l$, $\sigma^l$ from equations (32) and (33) in function block 804. Then, in function block 805, l is set to l+1, and a test is made in decision block 806 to determine whether l is equal M. If not, the process loops back to function block 804. If, on the other hand, l is equal to M, then l is set to 1 in function block 808, and i is set to 0 in function block 809. At this point, the process enters a second processing loop. In function block 810, $B_l(\alpha_0+i\Delta)$ is computed and stored. A test is then made in decision block 811 to determine if $\alpha_0+i\Delta$ greater than $\alpha_1$. If not, i is incremented to i+1 in function block 812, and the process loops back to function block 810. If, on the other hand, $\alpha_0+i\Delta$ greater than $\alpha_1$, then, $\hat{\alpha}^l$ is calculated in function block 813 (FIG. 47B). In function block 814, a is updated, as in Lemma 3. For dimension l, we now have $\mu^l=\hat{\mu}^l$, $\sigma^l=\hat{\sigma}^l$ and $\alpha^l=\hat{\alpha}^l$ in output block 815. A test is then made in decision block 816 to determine if l is equal to m. If not, l is incremented to l+1 in function block 817, and the process loops back to function block 809 (FIG. 47A). Otherwise, a further test is made in decision block 818 to determine if there is convergence. If not, the iteration number is incremented in function block 819, and the process loops back to function block 803 (FIG. 47A). If there is convergence as determined in decision block 818, then the final values of $\mu$, $\sigma$, $\alpha$ are output at output block 820.

Conclusion

We have addressed the issue of finding the optimal value of α in probability densities for speech data. Furthermore, the strategy of allowing different mixture components to have different α-values were also examined. The results indicate a cleat departure from Gaussian mixture modeling.

It is reasonable to assume that the optimal value of α depends on the number of components in the mixture model used. An extreme situation is when the number of components equals the number of data points and the best modeling is then achieved by a set of delta functions (i.e., α-densities with α=0) coinciding with the data points. On the other, if the data is, say, guassian, distributed and one is forced to use only one component in the mixture model, clearly a set of delta functions appears to be most inappropriate. Thus, a more adequate strategy for finding "optimal" value of α, or more generally h(t), must take into account the number of mixture components more appropriate function.

While the invention has been described in terms of preferred embodiments, those skilled in the art will recognize that the invention can be practiced with modification within the spirit and scope of the appended claims.

Having thus described our invention, what we claim as new and desire to secure by Letters Patent is as follows:

1. A computer implemented method for automatic machine recognition of speech, comprising the steps of:
   inputting acoustic data; and
   iteratively refining parameter estimates of densities comprising mixtures of power exponential distributions whose parameters are means ($\mu$), variances ($\sigma$), impulsivity numbers ($\alpha$) and mixture weights (w),
   wherein the step of iteratively refining comprises the steps of:
      predetermining initial values of the parameters $\mu$, $\sigma$ and w;
      iteratively deriving the parameters $\mu$, $\sigma$ and $\alpha$ such that for impulsivities equal to that of a speech Gaussian yields updating for an expectation-maximization process; and
      determining a non-decreasing value of a log likelihood of the parameters in order to get final values of the parameters $\mu$, $\sigma$ and $\alpha$.

2. The computer implemented method of claim 1, wherein the log likelihood of the parameters is determined by $$B(\Lambda, \hat{w}, \hat{\Lambda}) = \sum_{l=1}^{m} B^l(\Lambda, \hat{w}, \hat{\Lambda})$$

where $$B^l(\Lambda, \hat{w}, \hat{\Lambda}) = \sum_{k=1}^{N} A_{lk} \left( \begin{array}{c} \frac{1}{2}\left(\sum_{i=1}^{d} \log \sigma_i^l\right) + \log \rho_d(\alpha^l) - \\ (\gamma_d(\alpha^l))^{\alpha^l/2}\left(\sum_{i=1}^{d} \frac{(x_i^k - \mu_i^l)^2}{\sigma_i^l}\right)^{\alpha^l/2} \end{array} \right).$$

3. The computer implemented method of claim 2, further comprising: storing the final values of the parameters $\mu$, $\sigma$ and $\alpha$.

4. A computer implemented method for automatic machine recognition of speech, comprising the steps of:
   inputting acoustic data; and
   iteratively refining parameter estimates of densities comprising mixtures of power exponential distributions whose parameters are means ($\mu$), variances ($\sigma$), impulsivity numbers ($\alpha$) and mixture weights (w),
   wherein the step of iteratively refining comprises the steps of:
      predetermining initial values of the parameters $\mu$, $\sigma$ and w;
      deriving $\mu^l$ and $\sigma^l$ from the following equations $$\mu_i^l = \frac{\sum_{k=1}^{N}\left(\sum_{j=1}^{d} \frac{(x_j^k - \hat{\mu}_j^l)^2}{\hat{\sigma}_j^l}\right)^{\hat{\alpha}^l/2 - 1} A_{lk} x_i^k}{\sum_{k=1}^{N}\left(\sum_{j=1}^{d} \frac{(x_j^k - \hat{\mu}_j^l)^2}{\hat{\sigma}_j^l}\right)^{\hat{\alpha}^l/2 - 1} A_{lk}}$$

and $$\sigma_i^l = \frac{\hat{\alpha}^l \gamma_d(\hat{\alpha}^l)^{\hat{\alpha}^l/2} \sum_{k=1}^{N}\left(\sum_{j=1}^{d} \frac{(x_j^k - \hat{\mu}_j^l)^2}{\hat{\sigma}_j^l}\right)^{\hat{\alpha}^l/2 - 1} A_{lk}(x_i^k - \hat{\mu}_i^l)^2}{A_l}$$

for i=1, ..., d and l=1, ..., m;
   updating $\sigma$ by assuming that $\theta=(\mu,\sigma,\alpha)$, $\hat{\theta}=(\hat{\mu},\hat{\sigma},\hat{\alpha})$ and letting $H(\mu,\sigma)=E_{\hat{\theta}}(\log f(\cdot|\theta))$, in which case H has a unique global maximum at $\mu=\hat{\mu}$, $\sigma=\hat{\sigma}$ where $$\beta(\alpha, \hat{\alpha}) = \left\{ \frac{\alpha \Gamma\left(\frac{\alpha+1}{\hat{\alpha}}\right)}{\Gamma\left(\frac{1}{\alpha}\right)} \right\}^{\frac{2}{\hat{\alpha}}} \frac{\Gamma\left(\frac{3}{\alpha}\right)\Gamma\left(\frac{1}{\alpha}\right)}{\Gamma\left(\frac{3}{\alpha}\right)\Gamma\left(\frac{1}{\alpha}\right)};$$

setting the l dimension by $\mu^l=\hat{\mu}^l$, $\sigma^l=\hat{\sigma}^l$ and $\alpha^l=\hat{\alpha}^l$; and
   determining the convergence of a mixture weights function in order to get final values of $\mu$, $\sigma$ and $\alpha$.

5. The computer implemented method of claim 4, wherein the mixture weights function is determined by $$B(\Lambda, \hat{w}, \hat{\Lambda}) = \sum_{l=1}^{m} B^l(\Lambda, \hat{w}, \hat{\Lambda})$$

where $$B^l(\Lambda, \hat{w}, \hat{\Lambda}) = \sum_{k=1}^{N} A_{lk} \left( \begin{array}{c} \frac{1}{2}\left(\sum_{i=1}^{d} \log \sigma_i^l\right) + \log \rho_d(\alpha^l) - \\ (\gamma_d(\alpha^l))^{\alpha^l/2}\left(\sum_{i=1}^{d} \frac{(x_i^k - \mu_i^l)^2}{\sigma_i^l}\right)^{\alpha^l/2} \end{array} \right).$$

6. The computer implemented method of claim 5, further comprising; storing final values of the parameters $\mu$, $\sigma$ and $\alpha$.

7. A speech recognition device, comprising:
   an input unit converting acoustic speech to digital signals;
   a central processing unit (CPU) connected to said input unit for receiving said digital signals, the CPU modeling said digital signals to a series of parameters, which can present a corresponding word by an index table, by iteratively refining parameter estimates of densities comprising mixtures of power exponential distributions whose parameters are means ($\mu$), variances ($\sigma$), impulsivity numbers ($\alpha$) and mixture weights (w);
   a memory unit connect to said CPU for storing and interchanging said parameters and said index table; and
   an output unit connected to said CPU for outputting said corresponding word,
   wherein the CPU iteratively refines parameter estimates by predetermining initial values of the parameters $\mu$, $\sigma$ and $\omega$, iteratively deriving the parameters $\mu$, $\sigma$ and $\alpha$ such that for impulsivities equal to that of a speech Gaussian yields updating for an expectation-maximization process, and determining a non-decreasing value of a log likelihood of the parameters in order to get final values of the parameters $\mu$, $\sigma$ and $\alpha$.

8. The speech recognition device of claim 7, wherein said memory unit stores programs, said index table and final values of the parameters $\mu$, $\sigma$ and $\alpha$.

9. The speech recognition device of claim 7, wherein said memory unit is a Random Access Memory (RAM).

10. The speech recognition device of claim 7, wherein said memory unit is a hard disk storage device.

11. The speech recognition device of claim 7, wherein said input unit is a microphone connected to an audio adapter board plugged into a feature bus of a computer system.

12. The speech recognition device of claim 11 wherein said audio adapter board includes an analog-to-digital converter (ADC) for sampling and converting acoustic signals generated by said microphone to said digital signals.

13. The speech recognition device of claim 7, wherein said output unit is a monitor.

* * * * *